(12) United States Patent
Luo et al.

(10) Patent No.: US 11,977,815 B2
(45) Date of Patent: May 7, 2024

(54) DIALOGUE PROCESSING METHOD AND DEVICE

(71) Applicant: HUAWEI TECHNOLOGIES CO., LTD., Guangdong (CN)

(72) Inventors: Hongfeng Luo, Shenzhen (CN); Yibo Zhang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 389 days.

(21) Appl. No.: 17/371,377

(22) Filed: Jul. 9, 2021

(65) Prior Publication Data

US 2021/0334071 A1    Oct. 28, 2021

Related U.S. Application Data

(63) Continuation of application No. PCT/CN2019/124441, filed on Dec. 11, 2019.

(30) Foreign Application Priority Data

Jan. 10, 2019    (CN) .......................... 201910025807.3

(51) Int. Cl.
*G06F 40/205*    (2020.01)
*G06F 3/16*    (2006.01)
*H04L 51/02*    (2022.01)

(52) U.S. Cl.
CPC ............ *G06F 3/167* (2013.01); *G06F 40/205* (2020.01); *H04L 51/02* (2013.01)

(58) Field of Classification Search
CPC ....... G06F 3/167; G06F 40/205; H04L 51/02; G10L 15/22; G10L 15/26; G10L 15/1822; G10L 15/18

(Continued)

(56) References Cited

U.S. PATENT DOCUMENTS 9,466,294 B1    10/2016    Tunstall-Pedoe et al.
9,996,531 B1    6/2018    Parastatidis et al.
(Continued)

FOREIGN PATENT DOCUMENTS

CN    107210033 A    9/2017
CN    107665704 A    2/2018
(Continued)

OTHER PUBLICATIONS

Office Action issued in CN201910025807.3, dated Mar. 22, 2023, 12 pages.
(Continued)

*Primary Examiner* — George C Monikang

(57) ABSTRACT

A dialogue processing method and device are provided. The method includes: A dialogue processing device receives dialogue information from user equipment; if the dialogue information does not include slot information that is corresponding to a first slot type and that can determine a service, the dialogue processing device obtains a service identifier set corresponding to the first slot type from a server, and sends the service identifier set to the user equipment; and after a target service identifier is received from the user equipment, the dialogue processing device requests a service corresponding to the target service identifier from the server, and sends execution success information to the user equipment. According to this method, a service item can be presented to a user in a timely manner, and the user can be prevented from initiating a plurality of rounds of dialogues with the dialogue processing device, thereby improving service execution efficiency and further improving use experience of the user.

13 Claims, 15 Drawing Sheets

(58) Field of Classification Search
USPC .................................. 704/9, 231, 246, 251
See application file for complete search history.

(56) References Cited

U.S. PATENT DOCUMENTS

| | | | |
|---|---|---|---|
| 2012/0022857 A1* | 1/2012 | Baldwin | ................ G10L 15/18 |
| | | | 704/E11.001 |
| 2016/0335532 A1* | 11/2016 | Sanghavi | ................ H04L 51/02 |
| 2017/0177715 A1 | 6/2017 | Chang et al. | |
| 2018/0114528 A1 | 4/2018 | Yasavur et al. | |
| 2018/0330721 A1 | 11/2018 | Thomson et al. | |

FOREIGN PATENT DOCUMENTS

| | | | |
|---|---|---|---|
| CN | 107886948 A | 4/2018 |
| CN | 108874774 A | 11/2018 |
| CN | 108920497 A | 11/2018 |
| CN | 108932946 A | 12/2018 |
| CN | 109002501 A | 12/2018 |
| CN | 109033223 A | 12/2018 |
| CN | 109063035 A | 12/2018 |
| CN | 109101545 A | 12/2018 |

OTHER PUBLICATIONS

Extended European Search Report issued in EP19909437.6, dated Jan. 11, 2022, 11 pages.
International Search Report and Written Opinion issued in PCT/CN2019/124441, dated Mar. 12, 2020, 9 pages.

* cited by examiner

| Slot list | | | | |
|---|---|---|---|---|
| Slot type name | Slot information base | Mandatory | Prompt | Question |
| Car type | Car.type | ● | ● | Question 1 |
| Destination | Destination | ● | ○ | Question 2 |
| Departure location | Departure | ○ | ○ | Question 3 |
| ✦ Add a slot type | | | | | ified service to be successfully executed.
DIALOGUE PROCESSING METHOD AND DEVICE

CROSS-REFERENCE TO RELATED APPLICATIONS

This application is a continuation of International Application No. PCT/CN2019/124441, filed on Dec. 11, 2019, which claims priority to Chinese Patent Application No. 201910025807.3, filed on Jan. 10, 2019, both of which are hereby incorporated by reference in their entireties

TECHNICAL FIELD

This application relates to the computer field, and in particular, to a dialogue processing method and device.

BACKGROUND

A man-machine dialogue system (referred to as a dialogue system below) may feed back information to a user in response to a speech input by the user. The dialogue system may include a task-oriented dialogue system (task-oriented systems) and a non-task-oriented dialogue system (non-task-oriented systems). The non-task-oriented dialogue system may be a chat-type dialogue system. The task-oriented dialogue system may trigger a determined service based on the speech of the user, and feed back a result of executing the corresponding service to the user.

A service-oriented dialogue system may correspond to a target server, and the target server is configured to provide and execute one or more services. Based on this, after receiving the speech input by the user, the dialogue system may obtain one or more pieces of mandatory slot information from the speech. The mandatory slot information is necessary information for indicating a service. For example, mandatory slot information of an air ticket booking service includes a departure location, a departure time, and a destination. Further, the dialogue system may detect whether the one or more pieces of mandatory slot information are all included in slot information preset in the dialogue system, and if the one or more pieces of mandatory slot information are all included in the slot information preset in the dialogue system, the dialogue system requests, based on the one or more pieces of mandatory slot information, the target server to execute a target service. The target server detects, in response to the request, whether the target service is included in the one or more services, and the target server executes the target service if the target service is included in the one or more services. Then, the dialogue system may feed back execution success information of the target service to the user. In addition, if any slot information in the one or more pieces of mandatory slot information is not included in the slot information preset in the dialogue system, or if the target service is not included in the one or more services, the dialogue system may feed back execution failure information of the target service to the user, and the user may continue to input speeches of other content to enable a specified service to be successfully executed.

It can be learned that, in the foregoing dialogue processing method, there are many rounds of dialogues between the user and the dialogue system, resulting in poor use experience of the user.

SUMMARY

This application provides a dialogue processing method and device, to resolve a problem that there are many rounds of dialogues between a user and a dialogue system in an existing dialogue processing method.

According to an embodiment of a first aspect, this application provides a dialogue processing method, and the method includes:

A dialogue processing device receives dialogue information from user equipment;

if the dialogue information does not include slot information that is corresponding to a first slot type and that can determine a service, the dialogue processing device obtains a service identifier set corresponding to the first slot type from a server, where the first slot type indicates a slot type corresponding to slot information that is in mandatory slot information and that is used to indicate a service identifier, and the service identifier set includes a plurality of service identifiers corresponding to the first slot type;

the dialogue processing device sends the service identifier set to the user equipment;

if a target service identifier is received from the user equipment, the dialogue processing device requests a service corresponding to the target service identifier from the server, where the target service identifier is within the service identifier set; and if execution success information of a service is received from the server, the dialogue processing device sends the execution success information to the user equipment.

In this implementation, if a service item defined by the server does not correspond to slot information of a corresponding slot type, the dialogue processing device feeds back a plurality of service identifiers maintained by the server to a user, so that corresponding slot information input by the user definitely corresponds to a specified service item in the server. In this way, the service item can be displayed to the user in a timely manner, and the user can be prevented from initiating a plurality of rounds of dialogues with the dialogue processing device, thereby improving service execution efficiency.

In an example embodiment, after the dialogue processing device receives the dialogue information from the user equipment and before the dialogue processing device obtains the service identifier set corresponding to the first slot type from the server, the method includes:

The dialogue processing device parses the dialogue information; and if the slot information corresponding to the first slot type is not obtained from the dialogue information through parsing, the dialogue processing device determines that the dialogue information does not include the slot information that is corresponding to the first slot type and that can determine a service. In an example embodiment, after the dialogue processing device receives the dialogue information from the user equipment and before the dialogue processing device obtains the service identifier set corresponding to the first slot type from the server, the method includes:

The dialogue processing device parses the dialogue information to obtain the slot information corresponding to the first slot type;

the dialogue processing device requests a service corresponding to the slot information from the server; and if execution failure information of a service is received from the server, the dialogue processing device determines that the dialogue information does not include the slot information that is corresponding to the first slot type and that can determine a service.

In this implementation, if slot information preset in the dialogue processing device does not correspond to mandatory slot information input by the user and/or the slot information preset in the dialogue processing device does not correspond to a service included in the server, the dialogue processing device can provide effective information and/or a processing policy in a timely manner, so that unnecessary dialogue rounds can be reduced and a processing manner can be flexible, thereby improving use experience of the user.

In an example embodiment, after the dialogue processing device receives the dialogue information from the user equipment and before the dialogue processing device sends the execution success information to the user equipment, the method further includes:

The dialogue processing device parses the dialogue information to obtain the slot information corresponding to the first slot type;

the dialogue processing device requests a service corresponding to the slot information from the server; and if the execution success information of the service is received from the server and the dialogue processing device does not include the slot information, the dialogue processing device adds the slot information to an information base corresponding to the first slot type.

It can be learned that in this implementation, rounds of dialogues between the dialogue processing device and a user can be reduced, a service can be provided for the user in a timely manner, and the dialogue processing device can update, in a timely manner, slot information maintained by the dialogue processing device.

In an example embodiment, before the dialogue processing device receives the dialogue information from the user equipment, the method includes:

The dialogue processing device receives a label addition instruction, where the label addition instruction corresponds to the first slot type; and the dialogue processing device adds a label to the first slot type.

Based on the descriptions of a relationship between slot information and a service, mandatory slot information includes slot information indicating a service identifier, for example, "Hitch Riding" in a car-hailing service, and regular slot information used to determine a service, for example, a destination "West Gate of Tsinghua University". A service provided by the server for the user is usually defined by a related service personnel, and therefore the service provided by the server may be changed. For example, a "Hitch Riding" service item is removed and a "Carpool" service item is put on sale. As a result, a service corresponding to a corresponding service identifier does not exist.

Based on this, to help the dialogue processing device recognize the first slot type and a second slot type, in this application, the first slot type may be marked in advance by adding a label based on an attribute of the foregoing mandatory slot type, thereby providing a basis for implementing the technical solution in this application.

In an example embodiment, the dialogue information is a text or audio.

According to an embodiment of a second aspect, this application provides a dialogue processing method, and the method includes:

User equipment sends dialogue information to a dialogue processing device;

the user equipment receives a service identifier set corresponding to a first slot type from the dialogue processing device and prompts the service identifier set corresponding to the first slot type, where the first slot type indicates a slot type corresponding to slot information that is in mandatory slot information and that is used to indicate a service identifier, and the service identifier set includes a plurality of service identifiers corresponding to the first slot type;

the user equipment sends a target service identifier to the dialogue processing device, where the target service identifier is within to the service identifier set; and the user equipment receives execution success information of a service from the dialogue processing device, where the service is a service corresponding to the target service identifier.

In this implementation, a user can obtain a desired service regardless of whether dialogue information input by the user includes slot information corresponding to the first slot type, regardless of a correspondence between slot information input by the user and slot information preset in the dialogue processing device, and regardless of a correspondence between slot information input by the user and a service provided by a server. In this way, the user can be prevented from initiating a plurality of rounds of dialogues, and the user can learn, in a timely manner, a plurality of services provided by the server, thereby improving use experience of the user.

In an example embodiment, that the user equipment prompts the service identifier set corresponding to the first slot type includes:

The user equipment prompts all service identifiers in the service identifier set.

In an example embodiment, that the user equipment prompts the service identifier set corresponding to the first slot type includes:

The user equipment prompts a portal identifier for linking the service identifier set;

the user equipment receives an opening instruction input by a user; and the user equipment prompts a page linked to the portal identifier, where the page includes all service identifiers in the service identifier set.

In an example embodiment, that the user equipment prompts the service identifier set corresponding to the first slot type includes:

The user equipment prompts a menu control, where the menu control prompts some service identifiers in the service identifier set;

the user equipment receives a prompt instruction input by a user; and the user equipment switches a service identifier prompted in the menu control.

In some embodiments, the first slot type may correspond to two or three service identifiers. In some other embodiments, the first slot type may correspond to more than a dozen service identifiers. In this implementation, a service identifier prompt manner can be flexibly set, thereby improving use experience of the user.

According to an embodiment of a third aspect, this application provides a dialogue processing method, and the method includes: A dialogue processing device receives dialogue information from user equipment, and then determines keywords corresponding to all mandatory slot types in the dialogue information. If any keyword in the keywords corresponding to all the mandatory slot types corresponds to at least two pieces of slot information of a corresponding slot type, the dialogue processing device determines specific slot information corresponding to an optimal service solution in the at least two pieces of slot information. Further, the dialogue processing device may request a service corresponding to the specific slot information from a server, and send execution success information of a corresponding service to the user equipment after receiving the execution success information of the corresponding service from the server.

In this implementation, the dialogue processing device may automatically provide a relatively optimal service for a user if a meaning of a keyword input by the user is vague. In this way, a plurality of rounds of dialogues with the user can be avoided, and an operation can be flexible, thereby further improving use experience of the user.

According to an embodiment of a fourth aspect, this application provides a dialogue processing method, and the method includes:

A dialogue processing device receives dialogue information from user equipment;

the dialogue processing device requests a service corresponding to slot information from a first server;

if execution failure information of the service is received from the first server, the dialogue processing device requests the service corresponding to the slot information from a second server; and if execution success information of the service is received from the second server, the dialogue processing device sends the execution success information of the service to the user equipment.

In this implementation, when the first server cannot provide a service, the dialogue processing device may trigger the second server to provide a corresponding service. In this way, rounds of dialogues between the dialogue processing device and a user can be reduced, and a service can be provided for the user in a timely manner.

According to an embodiment of a fifth aspect, this application provides a dialogue processing method, and the method includes:

receiving dialogue information input by a user;

if the dialogue information does not include slot information that is corresponding to a first slot type and that can determine a service, obtaining a service identifier set corresponding to the first slot type from a local application or a server, where the first slot type indicates a slot type corresponding to slot information that is in mandatory slot information and that is used to indicate a service identifier, and the service identifier set includes a plurality of service identifiers corresponding to the first slot type;

prompting a service identifier in the service identifier set;

if the user determines a target service identifier from the service identifier set, requesting a service corresponding to the target service identifier from the local application or the server; and prompting execution success information of the service.

In an example embodiment, after the receiving dialogue information input by a user and before the obtaining a service identifier set corresponding to the first slot type from a local application or a server, the method includes:

if the slot information corresponding to the first slot type is not obtained from the dialogue information through parsing, determining that the dialogue information does not include the slot information that is corresponding to the first slot type and that can determine a service.

In an example embodiment, after the receiving dialogue information input by a user and before the obtaining a service identifier set corresponding to the first slot type from a local application or a server, the method includes:

parsing the dialogue information to obtain the slot information corresponding to the first slot type;

requesting a service corresponding to the slot information from the local application or the server; and if requesting of a service from both the local application and the server fails, determining that the dialogue information does not include the slot information that is corresponding to the first slot type and that can determine a service.

In an example embodiment, the obtaining a service identifier set corresponding to the first slot type from a local application or a server includes:

obtaining the service identifier set corresponding to the first slot type from the local application; or obtaining the service identifier set corresponding to the first slot type from the server; or invoking the local application to obtain the service identifier set corresponding to the first slot type from the server.

In an example embodiment, the prompting a service identifier in the service identifier set includes:

prompting all service identifiers in the service identifier set; or prompting a portal identifier for linking the service identifier set; and for an opening instruction input by a user, prompting a page linked to the portal identifier, where the page includes all service identifiers in the service identifier set; or prompting a menu control, where the menu control prompts some service identifiers in the service identifier set; and for a prompt instruction input by a user, switching a service identifier prompted in the menu control.

According to an embodiment of a sixth aspect, this application provides a dialogue processing device. The dialogue processing device has a function of implementing behavior of a radio access network device in the foregoing method. The function may be implemented by hardware, or may be implemented by hardware executing corresponding software. The hardware or the software includes one or more modules corresponding to the foregoing function. In an example embodiment, a structure of the radio access network device includes a processor and a transceiver. The processor is configured to process a corresponding function in the foregoing method performed by the dialogue processing device. The transceiver is configured to implement information exchange between the dialogue processing device, and user equipment and a server. The dialogue processing device may further include a memory. The memory is configured to be coupled to the processor, and stores program instructions and data that are necessary for the dialogue processing device.

According to an embodiment of a seventh aspect, this application provides user equipment. The user equipment has a function of implementing behavior of the user equipment in the foregoing method. The function may be implemented by hardware, or may be implemented by hardware executing corresponding software. The hardware or the software includes one or more modules corresponding to the foregoing function. In an example embodiment, a structure of the user equipment includes a processor and a transceiver. The processor is configured to process a corresponding function in the foregoing method performed by the user equipment. The transceiver is configured to implement communication between the user equipment and a dialogue processing device. The user equipment may further include a memory. The memory is configured to be coupled to the processor, and the memory stores program instructions and data that are necessary for the user equipment.

According to an embodiment of an eighth aspect, this application provides a man-machine interaction system. The man-machine interaction system includes user equipment, a dialogue processing device, and a server, and the dialogue processing device separately communicates with the user equipment and the server, to complete the man-machine dialogue operation in any one of the first aspect, the second aspect, the third aspect, the example embodiments of the first aspect, and the example embodiments of the second aspect. The dialogue processing device is the dialogue processing device in the fifth aspect, and the user equipment is the user equipment in the sixth aspect.

According to an embodiment of a ninth aspect, this application provides a man-machine interaction system. The man-machine interaction system includes user equipment, a dialogue processing device, a first server, and a second server. The dialogue processing device separately communicates with the user equipment, the first server, and the second server, to complete the man-machine dialogue operation in the fourth aspect. The dialogue processing device is the dialogue processing device in the fifth aspect, and the user equipment is the user equipment in the sixth aspect.

According to an embodiment of a tenth aspect, this application provides a computer readable storage medium. The computer readable storage medium stores instructions, and when the instructions are run on a computer, the computer is enabled to perform any one of the foregoing possible methods.

To resolve a problem that there are many rounds of man-machine dialogues in the prior art, in this application, if a service item defined by a server does not correspond to slot information of a corresponding slot type, a dialogue processing device feeds back a service identifier maintained by the server to a user, so that corresponding slot information input by the user definitely corresponds to a specified service item in the server. In this implementation, a service item can be presented to the user in a timely manner, and the user can be prevented from initiating a plurality of rounds of dialogues with the dialogue processing device, thereby improving service execution efficiency and further improving use experience of the user.

BRIEF DESCRIPTION OF DRAWINGS

To describe the technical solutions in this application more clearly, the following briefly describes the accompanying drawings for describing the embodiments. It is clearly that a person of ordinary skill in the art may still derive other drawings from these accompanying drawings without creative efforts.

DESCRIPTION OF EMBODIMENTS

Figure 1:
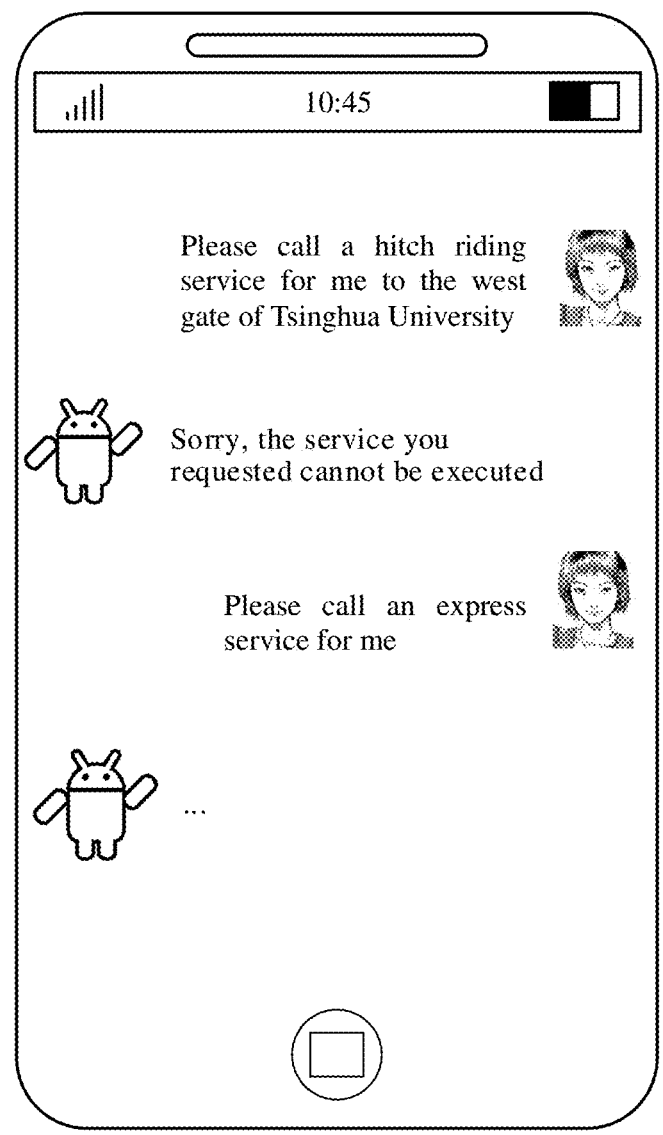
FIG. 1 is a user interface of an implementation of a plurality of rounds of dialogues according to an embodiment of this application.

The following clearly describes technical solutions of this application with reference to accompanying drawings.

Terms used in the following embodiments of this application are merely intended for the purpose of describing specific embodiments, but not intended to limit this application. The terms "one", "a" and "this" of singular forms used in this specification and the appended claims of this application are also intended to include plural forms, unless otherwise specified in the context clearly. It should be further understood that although terms such as first and second may be used in the following embodiments to describe a specified class of objects, the objects should not be limited to these terms. These terms are merely used to distinguish specific objects of this class of objects. For example, terms such as first and second may be used in the following embodiments to describe a server, but the server should not be limited to these terms. These terms are merely used to distinguish different servers. Similarly, terms such as first and second may be used in the following embodiments to describe other types of objects. Details are not repeated herein. In addition, the term "and/or" used in this application indicates and includes any or all possible combinations of one or more associated listed items.

Before the technical solutions of this application are described, technical scenarios of this application and technical terms in this application are first described.

This application relates to information exchange between a dialogue processing device and user equipment (UE) and between the dialogue processing device and a server. The user equipment is a medium for a dialogue between a user and the dialogue processing device. The user equipment transmits, to the dialogue processing device, information input by the user, and prompts information fed back by the dialogue processing device. After receiving the information sent by the user equipment, the dialogue processing device may request the server to execute a service indicated by the corresponding information. After receiving an execution result of the service from the server, the dialogue processing device sends the execution result to the user equipment.

A dialogue management device may maintain an intent, a slot type, and slot information. The server maintains service information. The following describes meanings of technical terms "intent", "slot type", "slot information", and "service information" and a relationship between the technical terms by using examples.

The intent is a purpose of the user and is used to indicate a requirement of the user. The dialogue processing device may recognize an intent of the user from information input by the user equipment. For example, the input information of the user equipment is "Please book an air ticket from city A to city B for me", and the dialogue processing device may recognize, from the input information, that the intent of the user is "Book an air ticket." A recognition model of the intent may be obtained through training based on a large quantity of corpora, and the large quantity of corpora are corpora used to express the intent in different expression manners. In addition, the dialogue processing device may maintain one or more intents.

The slot information (slot) is specific information about intent content and is also key information used to trigger a specific service. The slot information is, for example, a keyword in the input information of the user equipment. For example, "city A" and "city B" in the input information "Please book an air ticket from city A to city B for me" are slot information of the input information. The slot information may include mandatory slot information and optional slot information. The mandatory slot information is necessary slot information for triggering a service. The optional slot information is unnecessary slot information for triggering a service. For example, mandatory slot information for triggering a service "Book an air ticket" includes a departure location "city A", a departure time "MM-HH-DD-MM-YYYY", and a destination "city B". In this example, the optional slot information is, for example, "country to which city B belongs".

The slot type (slot_type) is used to identify a class of the slot information. For example, the slot information "city A" and the slot information "city B" belong to a slot type "address", and the slot information "MM-HH-DD-MM-YYYY" belongs to a slot type "time". It may be understood that one slot type corresponds to a specific knowledge base. Based on an attribute of slot information, all slot information belonging to one slot type may be stored in the dialogue processing device in different structure forms. For example, slot information corresponding to the slot type "address" may be stored in the dialogue processing device in a form of a city name list. For another example, slot information corresponding to the slot type "time" may be all expression manners of time. Generally, one intent may correspond to one or more slot types. For example, the intent "Book an air ticket" corresponds to the slot type "address" and the slot type "time".

A service is an action purposefully performed by the server to complete a specific service item. In the server, the service may be identified by using a service identifier. In this application, one or more pieces of mandatory slot information may be used to determine one service. The service identifier of the service corresponds to one piece of slot information in the one or more pieces of mandatory slot information, or the service identifier of the service is one piece of slot information in the one or more pieces of mandatory slot information. Based on the foregoing descriptions of the mandatory slot information, the slot information "city A", the slot information "city B", and the slot information "MM-HH-DD-MM-YYYY" are used to determine a service "Please book an air ticket scheduled at MM-HH-DD-MM-YYYY from city A to city B for me". An air ticket booking server associates an air ticket "scheduled at MM-HH-DD-MM-YYYY from city A to city B" with user information, and if the air ticket is marked as booked, a service of booking the air ticket "scheduled at MM-HH-DD-MM-YYYY from city A to city B" is executed. The service may be represented in a form such as an instruction, a program, or a process.

The dialogue processing device is a device that can process a speech or a text sent by the user and feed back the speech or the text to the user. In some embodiments, the dialogue processing device is hosted in a robot (Bot) for a man-machine dialogue, and the bot exists independently of the user equipment used by the user, and exchanges information with the user equipment through wireless communication. In some other embodiments, a skill or a program that supports dialogue processing is hosted in the user equipment. In this scenario, the user equipment and the dialogue processing device are an electronic device entity.

The server may be a computer, an operating system, or a cloud server (elastic compute service, ECS) that bears a program corresponding to a service item. When the program borne by the server is run, the foregoing service item can be provided, and each service item corresponds to a corresponding service identifier. The program borne by the server may be source code written in a specific computer program language, for example, a hypertext markup language (HTML), a hypertext preprocessor (PHP), and a JavaScript (JS). The source code may be loaded and displayed as user-recognizable content by a browser or a web page display component similar to a browser function. Based on this, a person of ordinary skill in the art may add a new service item to the server or delete an existing service item by modifying the source code.

In some embodiments, the user equipment may be a portable electronic device that further includes another function such as a personal digital assistant and/or a music player function, for example, a mobile phone, a tablet computer, or a wearable electronic device (for example, a smartwatch) with a wireless communication function. An example embodiment of a portable electronic device includes but is not limited to a portable electronic device using iOS®, Android®, Microsoft®, or another operating system. The portable electronic device may be alternatively another portable electronic device, for example, a laptop computer (Laptop) with a touch-sensitive surface or a touch panel. It should be further understood that in some embodiments, the device is not a portable communications device, but a desktop computer that has a touch-sensitive surface or a touch panel.

The user equipment may exchange information with the dialogue processing device by using a user interface (UI). The user interface is a medium interface for interaction and information exchange between an application or an operating system and the user, and implements conversion between an internal form of information and a form acceptable to the user. A user interface of an application is source code written in a specific computer language such as Java or an extensible markup language (XML). The interface source code is parsed and rendered on a terminal device, and is finally presented as content that can be identified by the user, for example, a control such as an image, a text, or a button. The control is also referred to as a widget, and is a basic element of the user interface. Typical controls include a toolbar, a menu bar, a text box, a button, a scrollbar, an image, and a text. An attribute and content of the control on the interface are defined by using a label or a node. For example, the XML specifies, by using a node such as <Textview>, <ImgView>, or <VideoView>, the control included in the interface. One node corresponds to one control on the interface or one attribute. After being parsed and rendered, the node is presented as content that is visible to the user.

A dialogue in this application is a "man-machine dialogue", that is, information exchange between the user and the dialogue processing device. In some embodiments, the user may send audio to the dialogue processing device by using the user equipment. In some other embodiments, the user may send a text to the dialogue processing device by using the user equipment. Correspondingly, in some embodiments, the dialogue processing device may convert an execution result into audio, and then send the audio to the user equipment. In some other embodiments, the dialogue processing device may convert an execution result into a text, and then send the text to the user equipment. Based on this, audio exchange between the user and the dialogue processing device, text exchange between the user and the dialogue processing device, and exchange between the user and the dialogue processing device during which one party sending audio and the other party sending a text, are all fall within the scope of "man-machine dialogue" in this application.

Based on an existing dialogue processing method, if preset slot information in the dialogue processing device does not include mandatory slot information input by the user equipment, the dialogue processing device cannot determine a to-be-requested first service, and consequently the first service fails to be executed. If a service included in the server does not include the first service requested by the dialogue processing device, the server cannot execute the first service requested by the dialogue processing device, and consequently the first service fails to be executed. A service requested by the user can be provided only when the first service is successfully executed. Therefore, after the dialogue processing device sends execution failure information of the first service to the user equipment, the dialogue processing device may receive a dialogue that is sent by the user equipment and that triggers a second service. An attribute of the second service is the same as that of the first service.

FIG. 1 shows an example user interface of a plurality of rounds of dialogues. In this embodiment, a user requests a car service by using a man-machine dialogue. As shown in FIG. 1, the user inputs "Please call a hitch riding service for me to the west gate of Tsinghua University" to user equipment. After receiving the information "Please call a hitch riding service for me to the west gate of Tsinghua University" sent by the user equipment, a dialogue processing device generates request information, and sends the request information to a target car-hailing server. The request information includes a current address of the user, a destination "West Gate of Tsinghua University", and mandatory slot information "Hitch Riding". For example, the target car-hailing server does not provide a "Hitch Riding" service, and therefore cannot execute a service triggered by the user. Correspondingly, the dialogue processing device sends information "Sorry, the service you requested cannot be executed" to the user equipment. Further, the user may continue to input "Please call an express service for me" to the user equipment, thereby initiating a new round of dialogue with the dialogue processing device. The dialogue processing device requests the "Express" service from the target car-hailing server based on the foregoing procedure of requesting the "Hitch Riding" service. If the target car-hailing server does not provide the "Express" service, the user and the dialogue processing device may need to perform more rounds of dialogues. In this case, the dialogue processing device continuously performs a dialogue processing operation, thereby occupying resources and resulting in poor use experience of the user.

In view of this, this application provides a dialogue processing method and device. If slot information preset in a dialogue processing device does not correspond to mandatory slot information input by a user and/or the slot information preset in the dialogue processing device does not correspond to a service included in a server, the dialogue processing device can provide effective information and/or a processing policy in a timely manner, so that unnecessary dialogue rounds can be reduced and a processing manner can be flexible, thereby improving use experience of the user.

The following describes an example dialogue processing device 10 provided in this application.

Figure 2A:
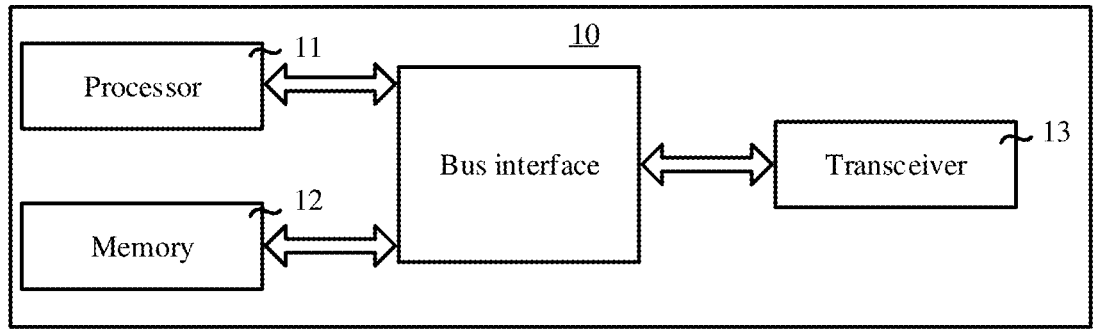
FIG. 2A is a schematic diagram of a hardware structure of a dialogue processing device 10 according to an embodiment of this application.

FIG. 2A is a schematic structural diagram of the dialogue processing device 10.

The dialogue processing device 10 includes a processor 11, a memory 12, and a transceiver 13. The processor 11, the memory 12, and the transceiver 13 are connected through a bus interface.

It may be understood that a structure shown in FIG. 2A does not constitute a specific limitation on the dialogue processing device 10. In some other embodiments of this application, the dialogue processing device 10 may include more or fewer components than those shown in the figure, or some components may be combined, or some components may be split, or components are arranged in different manners. The components shown in the figure may be implemented by using hardware, software, or a combination of software and hardware.

The processor 11 may be a central processing unit (CPU), a network processor (NP), or a combination of a CPU and an NP. The processor may further include a hardware chip. The hardware chip may be an application-specific integrated circuit (ASIC), a programmable logic device (PLD), or a combination thereof. The PLD may be a complex programmable logic device (CPLD), a field-programmable gate array (FPGA), a generic array logic (GAL), or any combination thereof.

The memory 12 may include a volatile memory, for example, a random access memory (RAM); the memory may include a non-volatile memory, for example, a read-only memory (ROM), a flash memory, a hard disk drive (HDD), or a solid-state drive (SSD); or the memory may include a combination of the foregoing types of memories.

The transceiver 13 may be a wired transceiver, a wireless transceiver, or a combination thereof. The wired transceiver may be, for example, an Ethernet interface. The Ethernet interface may be an optical interface, an electrical interface, or a combination thereof. The wireless transceiver may be, for example, a wireless local area network transceiver, a cellular network transceiver, or a combination thereof.

The bus interface may include any quantity of interconnect buses and bridges, specifically for interconnecting various circuits of one or more processors represented by the processor 11 and a memory represented by the memory 12. The bus interface may also link various other circuits such as a peripheral device, a voltage regulator, and a power management circuit. The transceiver 13 provides a unit configured to communicate with various other devices (for example, user equipment and a server) on a transmission medium. The processor 11 is responsible for bus architecture management and general processing. The memory 12 may store data used when the processor performs an operation.

A person of ordinary skill in the art may further understand that various illustrative logical blocks and steps that are listed in the embodiments of this application may be implemented by using electronic hardware, computer software, or a combination thereof. Whether the functions are implemented by using hardware or software depends on particular applications and a design requirement of the entire system. A person of ordinary skill in the art may use various methods to implement the described functions for each particular application, but it should not be considered that the implementation goes beyond the scope of the embodiments of this application.

A hardware architecture shown in FIG. 2A relates to a hardware component for performing dialogue processing. For example, the transceiver 13 may be configured to receive and send information between the dialogue processing device and the user equipment, for example, receive speech information sent by the user equipment, and send a service identifier and an execution result to the user equipment. The transceiver 13 may be further configured to receive and send information between the dialogue processing device and the server, for example, send service request information to the server, and receive a service identifier and an execution result from the server. The memory 12 is configured to store instructions and data. In some embodiments, the memory 12 may store instructions or data that has just been used or cyclically used by the processor 11. If the processor 11 needs to use the instructions or the data again, the processor 11 may directly invoke the instructions or the data from the memory 12, to avoid repeated access. The memory 12 is further configured to store one or more pieces of intent information, one or more slot types corresponding to each of the one or more pieces of intent information, and slot information included in each of the one or more slot types. The processor 11 invokes the instructions and the data in the memory 12 to perform an operation other than information receiving and sending, for example, recognizing a speech, parsing semantics, and determining a user intent and slot information based on parsed semantics.

Figure 2B:
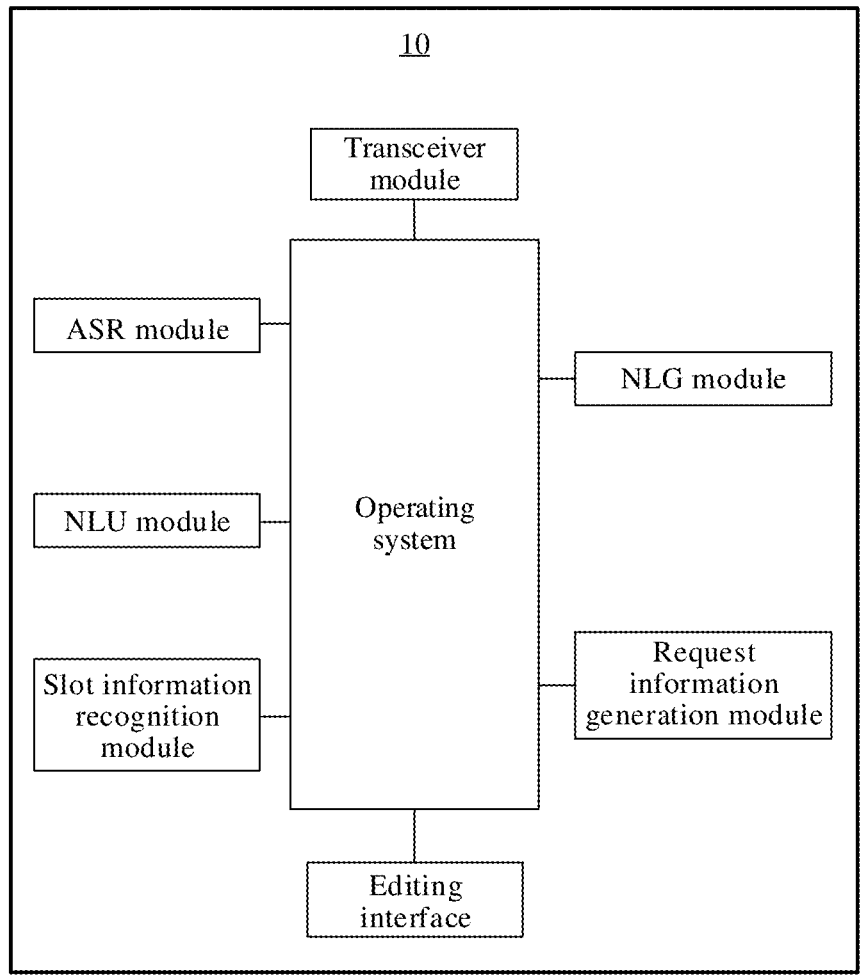
FIG. 2B is a schematic diagram of a software architecture of a dialogue processing device 10 according to an embodiment of this application.

FIG. 2B is a block diagram of a software structure of the dialogue processing device 10 according to an embodiment of this application.

A software system of the dialogue processing device 10 may include function modules configured to perform various functions of dialogue processing, for example, an operating system, a transceiver module, a speech recognition (automatic speech recognition, ASR) module, a semantic understanding (natural language understanding, NLU) module, a dialogue generation (natural language generation, NLG) module, a slot information recognition module, and a request information generation module.

In some embodiments, the dialogue processing device 10 further includes an editing interface. When the editing interface is triggered, an editing operation interface may be presented.

The software system shown in FIG. 2B relates to function modules for performing dialogue processing, and the operating system drives the modules to perform operations. For example, after the transceiver module receives a dialogue speech of the user, the ASR module recognizes the speech, and then the NLU module parses semantics of the recognized speech. Further, the slot information recognition module may recognize slot information from the parsed semantics, and the request information generation module generates service request information. After the transceiver module receives an execution result of a service from the server, the NLG module generates a speech based on the execution result, and then the transceiver module sends the generated speech to the user equipment.

The following describes example user equipment 20 provided in the following embodiments of this application.

Figure 3A:
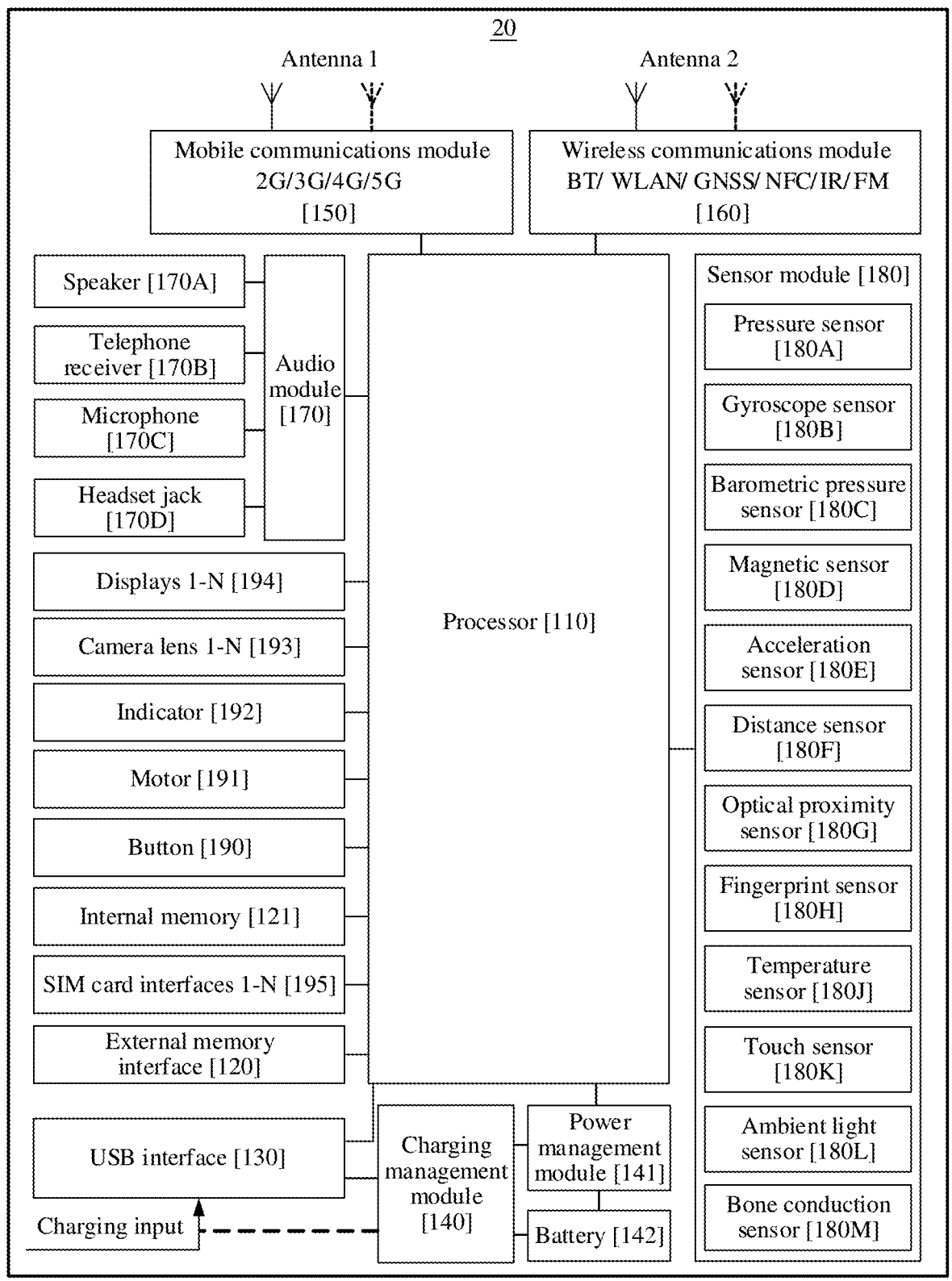
FIG. 3A is a schematic diagram of a hardware structure of user equipment 20 according to an embodiment of this application.

FIG. 3A is a schematic structural diagram of the user equipment 20 according to an embodiment of the present disclosure.

The user equipment 20 may include a processor 110, an external memory interface 120, an internal memory 121, a universal serial bus (USB) interface 130, a charging management module 140, a power management module 141, a battery 142, an antenna 1, an antenna 2, a mobile communications module 150, a wireless communications module 160, an audio module 170, a speaker 170A, a telephone receiver 170B, a microphone 170C, a headset jack 170D, a sensor module 180, a button 190, a motor 191, an indicator 192, a camera lens 193, a display 194, a subscriber identity module (subscriber identification module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this application does not constitute a specific limitation on the user equipment 20. In some other embodiments of this application, the user equipment 20 may include more or fewer components than those shown in the figure, or some components may be combined, or some components may be split, or components are arranged in different manners. The components shown in the figure may be implemented by using hardware, software, or a combination of software and hardware.

The processor 110 may include one or more processing units. For example, the processor 110 may include an application processor (AP), a controller, and a memory. Different processing units may be separate components, or may be integrated into one or more processors. In some embodiments, the user equipment 20 may further include one or more processors 110.

The controller may be a nerve centre and a command centre of the user equipment 20. The controller may generate an operation control signal based on an instruction operation code and a time sequence signal, to complete control of instruction reading and instruction execution.

The memory may be further disposed in the processor 110, to store instructions and data. In some embodiments, the memory in the processor 110 is a cache. The memory may store instructions or data that has just been used or cyclically used by the processor 110. If the processor 110 needs to use the instructions or the data again, the processor 110 may directly invoke the instructions or the data from the memory, to avoid repeated access and reduce a waiting time of the processor 110, thereby improving efficiency of the user equipment 20.

In some embodiments, the processor 110 may include one or more interfaces. The one or more interfaces include an interface for implementing communication between the processor 110 and the audio module 170, an interface for connecting the processor 110 and the display 194, and the like.

A wireless communication function of the user equipment 20 may be implemented by using the antenna 1, the antenna 2, the mobile communications module 150, the wireless communications module 160, a modem processor, a baseband processor, and the like.

The wireless communications module 160 may provide a solution to wireless communication applied to the user equipment 20, for example, a wireless local area network (WLAN) (for example, a wireless fidelity (Wi-Fi) network). In some embodiments, the antenna 2 and the wireless communications module 160 of the user equipment 20 are coupled, so that the user equipment 20 can communicate with a network and another device by using a wireless communications technology.

The display 194, the application processor, and the like of the user equipment 20 may implement a prompt function. The display 194 is configured to prompt a text, a menu, an audio control, and the like.

The user equipment 20 may implement an audio function by using the audio module 170, the speaker 170A, the telephone receiver 170B, the microphone 170C, the headset jack 170D, the application processor, and the like, for example, audio playing and recording.

The audio module 170 is configured to convert digital audio information into an analog audio signal output, and is further configured to convert an analog audio input into a digital audio signal. The audio module 170 may be further configured to encode and decode an audio signal.

The speaker 170A, also referred to as a "loudspeaker", is configured to convert an audio electrical signal into a sound signal. The user equipment 20 may listen, by using the speaker 170A, an audio dialogue sent by the dialogue processing device.

The telephone receiver 170B, also referred to as an "earpiece", is configured to convert an audio electrical signal into a sound signal. When the user equipment 20 receives audio information, the user may listen a sound of the audio information by placing the telephone receiver 170B close to an ear.

The microphone 170C, also referred to as a "microphone", is configured to convert a sound signal into an electrical signal. When sending speech information, the user may speak with the mouth approaching the microphone 170C, to input a sound signal to the microphone 170C. At least one microphone 170C may be disposed in the user equipment 20.

The user equipment 20 shown in FIG. 3A as an example may display and prompt, by using the display 194, various user interfaces described in the following speech embodiments. The user equipment 20 may input speech information to each user interface by using the microphone 170C, or may play, by using the speaker 170A or the telephone receiver 170B, audio prompted by the user interface.

The software system of the user equipment 20 may use a layered architecture. In this application, a software structure of the user equipment 20 is illustrated by using an Android system with a layered architecture as an example.

Figure 3B:
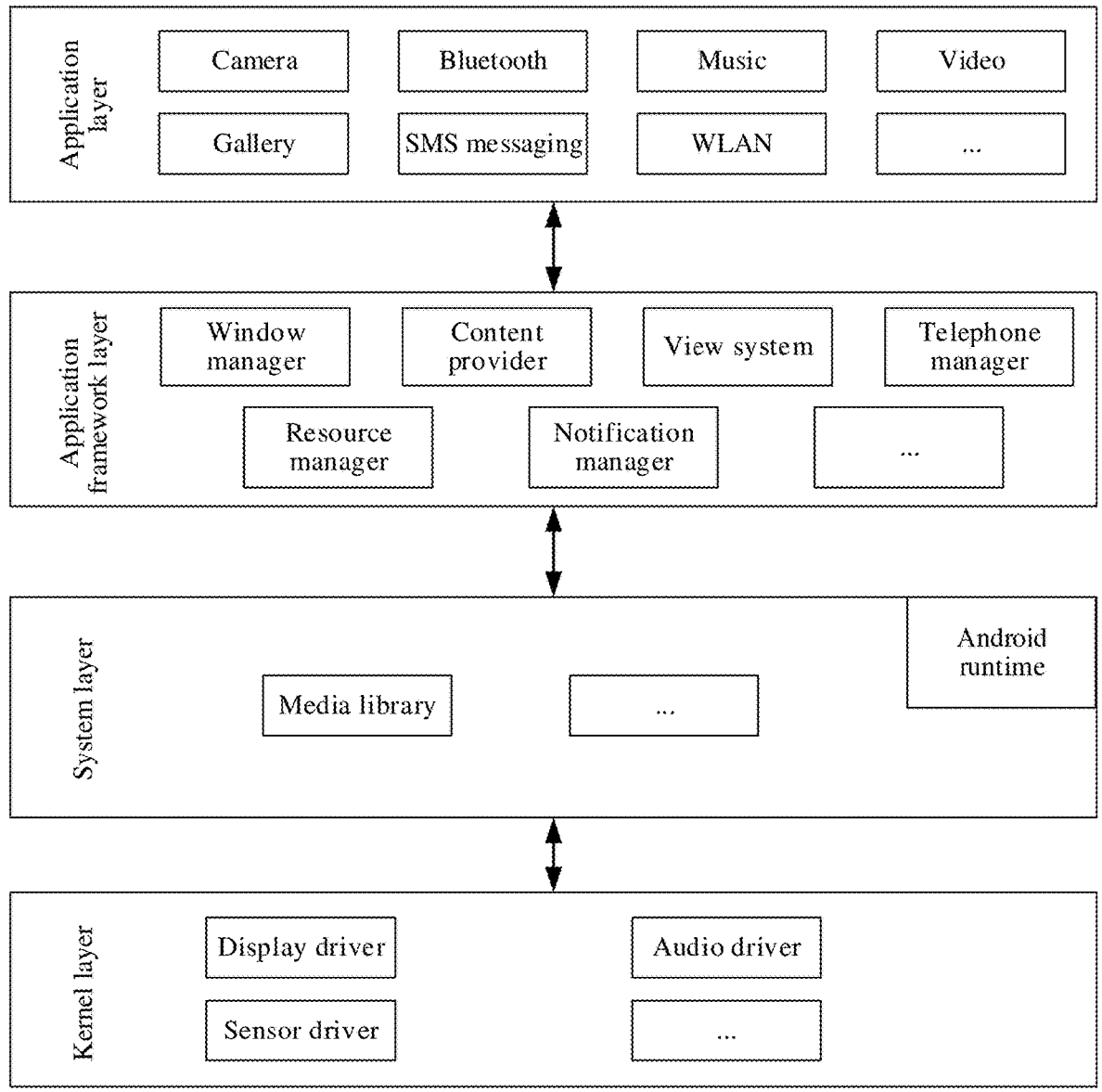
FIG. 3B is a schematic diagram of a software architecture of user equipment 20 according to an embodiment of this application.

FIG. 3B is a block diagram of the software structure of the user equipment 20 according an embodiment of to this application.

In the layered architecture, software is divided into several layers, and each layer has a clear role and task. Layers communicate with each other through a software interface. In some embodiments, the Android system is divided into four layers from top to bottom: an application layer, an application framework layer, an Android runtime and system library, and a kernel layer.

The application layer may include a series of application packages.

As shown in FIG. 3B, the application package may include applications such as Camera, Gallery, WLAN, Bluetooth, Music, Video, and SMS messaging.

The application framework layer provides an application programming interface (API) and a programming framework for an application at the application layer. The application framework layer includes some predefined functions.

As shown in FIG. 3B, the application framework layer may include a window manager, a content provider, a view system, a telephone manager, a resource manager, a notification manager, and the like.

The window manager is configured to manage a window program. The window manager may obtain a size of the display, determine whether there is a status bar, lock the screen, capture the screen, and the like.

The content provider is configured to store and obtain data, so that the data can be accessed by an application. The data may include a video, an image, an audio, a text, and the like.

The view system includes a visual control such as a text display control. The view system may be configured to construct an application. A display interface may include one or more views.

A media library supports a plurality of types of common audio playback, recording, and the like. The media library may support a plurality of audio and video encoding formats such as MPEG4, H.264, MP3, AAC, AMR, JPG, and PNG.

The kernel layer is a layer between hardware and software. The kernel layer includes at least a display driver, an audio driver, and a sensor driver.

The software system shown in FIG. 3B relates to application presentation (for example, the window manager and the view system) of performing a man-machine dialogue, providing audio encoding and decoding services, and kernel and basic communication protocols.

The following describes, by using examples, working procedures of software and hardware of the user equipment 20 with reference to a man-machine dialogue scenario.

After a display 121 presents an application interface of a man-machine dialogue, the microphone 170C receives speech audio of the user. Correspondingly, the audio driver of the kernel layer is triggered to convert the speech audio of the user into an electrical signal. The wireless communications module 160 sends the electrical signal to the dialogue processing device. After the wireless communications module 160 receives the audio from the dialogue processing device, the display driver of the kernel layer invokes the window manager to display the audio. After the pressure sensor 180A receives an instruction for playing the audio, a corresponding hardware interrupt is sent to the kernel layer. The audio driver of the kernel layer triggers the audio module 170 to decode the audio, and the decoded audio is played by using the speaker 170A or the telephone receiver 170B.

Based on the foregoing descriptions of a relationship between slot information and a service, mandatory slot information includes slot information indicating a service identifier, for example, "Hitch Riding" in a car-hailing service, and regular slot information used to determine a service, for example, a destination "West Gate of Tsinghua University". A service provided by the server for the user is usually defined by a related service personnel, and therefore the service provided by the server may be changed. For example, a "Hitch Riding" service item is removed and a "Carpool" service item is put on sale. As a result, a service corresponding to a corresponding service identifier does not exist. However, the user may not be able to learn, in a timely manner, a service provided by the server. In addition, related slot information maintained in the dialogue processing device may not be able to be updated in a timely manner, thereby causing some of the foregoing problems in this application. In this application, a slot type to which slot information that is in mandatory slot information and that is used to indicate a service identifier belongs is referred to as a "first slot type", and a slot type of regular slot information in the mandatory slot information is referred to as a "second slot type" below. Correspondingly, the "first slot type" referenced below is a slot type to which slot information that is in mandatory slot information and that is used to indicate a service identifier belongs, and the "second slot type" referenced below is a slot type of regular slot information in the mandatory slot information.

To help the dialogue processing device recognize the first slot type and the second slot type, in a process of designing the dialogue processing device, a developer may mark the first slot type by adding a label based on an attribute of the foregoing mandatory slot type. For example, the developer may add a label "M" to the first slot type in the mandatory slot type, but does not add any label to the first slot type in the mandatory slot type. Correspondingly, if the dialogue processing device reads a slot type carrying the label "M", the dialogue processing device determines the slot type as the first slot type. If the dialogue processing device reads a mandatory slot type that does not carry the label "M", the dialogue processing device determines the mandatory slot type as the second slot type.

In some embodiments, in a process of designing a program related to a slot type, the developer may directly add a label to the first slot type. In some other embodiments, this application may provide an editing interface, and the developer may classify slot types in a checking manner on the editing interface.

Figures 4, 5A:
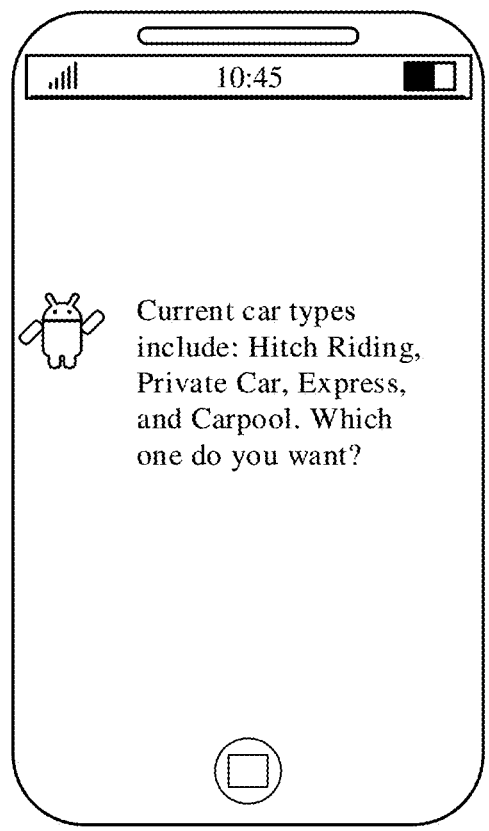
FIG. 4 is a schematic diagram of an operation interface according to an embodiment of this application.
FIG. 5A is a schematic diagram of a first implementation of a user interface according to an embodiment of this application.

FIG. 4 shows an example editing interface of a slot type according to an embodiment of the present disclosure. A slot list shown in the editing interface may include five items: a slot type name, a slot information base corresponding to the slot type, a mandatory slot option, a prompt option, and a question. The slot type name is used to name a slot type to identify the corresponding slot type. The slot information base corresponding to the slot type may be a link that is used to link a slot information base corresponding to a slot type in a same row. The question indicates various expression manners corresponding to slot information of a slot type in a corresponding row. If the mandatory slot option is selected, it is considered that the slot type in the corresponding row is marked as a mandatory slot type. Correspondingly, the slot type is labeled "Mandatory". The prompt option is an option used to mark whether a slot type is the first slot type in this embodiment. Based on this, similarly, if the prompt option is selected, it is considered that the slot type in the corresponding row is marked as the first slot type. Correspondingly, the slot type is labeled "Prompt". It should be noted that, in this embodiment, the prompt option in the row can be operated only when the mandatory slot option in the corresponding row is selected. In addition, the developer may further trigger "+Add a slot type" as required to add a slot type, and click a delete symbol to delete a slot type in a row corresponding to the delete symbol.

Based on the foregoing descriptions, in the embodiment shown in FIG. 4, a slot type "Car Type" and a slot type "Destination" are mandatory slot types, and a slot type "Departure Location" is an optional slot type. In the mandatory slot types, "Car Type" is the first slot type, and "Destination" is the second slot type.

Based on this, in the technical solution of this application, if the user does not input slot information corresponding to the first slot type or slot information that is corresponding to the first slot type and that is input by the user does not match a service, the dialogue processing device feeds back a plurality of service identifiers corresponding to the first slot type to the user, so that the user selects one of the plurality of service identifiers as corresponding slot information, to quickly and accurately trigger a service.

In some embodiments, the plurality of service identifiers may be all service identifiers corresponding to the first slot type in the server. In some other embodiments, the plurality of service identifiers may be some service identifiers corresponding to the first slot type in the server. Specifically, the plurality of service identifiers may be service identifiers in which user's positive comments are higher than a specified value, for example, service identifiers corresponding to service items whose user's positive comments are higher than 95%. Alternatively, the plurality of service identifiers may be service identifiers of service items updated within a specified time period from a current time. For example, the plurality of service identifiers are service identifiers of service items updated within the latest three months.

It may be understood that the foregoing selection condition of "the plurality of service identifiers" is merely a selection condition corresponding to some example implementation scenarios of this application, and does not constitute a specific limitation on selection of "the plurality of service identifiers". In some other embodiments, selection of "the plurality of service identifiers" may be flexibly set based on another implementation scenario.

The following describes an implementation scenario of a user end in this application with reference to an example user interface.

First implementation scenario: A user inputs dialogue information to user equipment, where the dialogue information does not include slot information corresponding to a first slot type. Then, the user equipment may receive all service identifiers corresponding to the first slot type from a dialogue processing device. The user may select a service identifier from all the service identifiers, and input the service identifier to the user equipment as the slot information of the first slot type.

In some embodiments, a total of two or three service identifiers may correspond to the first slot type. For example, the first slot type is "Car Type" in a car-hailing service, and "Car Type" corresponds to three service identifiers: "Hitch Riding", "Private Car", and "Express". In some other embodiments, a total of dozens of service identifiers may correspond to the first slot type. For example, the first slot type is "Drink" in a food ordering service, and "Drink" corresponds to 10 types such as "Cola", "Sprite", "Soymilk", "Coffee", "Juice", "Milk", "Black Tea", "Green Tea", "Milk Tea", and "Beer." However, a size of a user interface is limited. Therefore, in some embodiments, when a quantity of all service identifiers is less than or equal to a preset threshold, the user equipment may prompt all the service identifiers on the user interface, as shown in a user interface shown in FIG. 5A. The preset threshold is, for example, 5. In some other embodiments, when a quantity of all service identifiers is greater than the preset threshold, the user equipment may prompt all the service identifiers on the user interface by using a link, as shown in a user interface shown in FIG. 5B. Alternatively, the user equipment may set a menu bar of a scrollbar, as shown in a user interface shown in FIG. 5C.

Figure 5B:
FIG. 5B is a schematic diagram of a second implementation of a user interface according to an embodiment of this application.
Figure 5C:
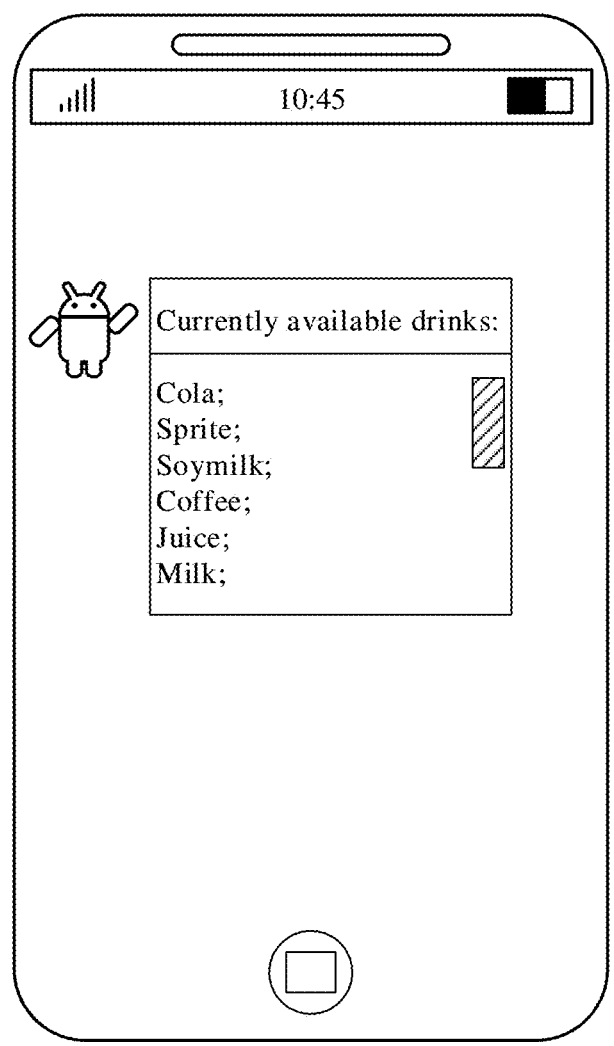
FIG. 5C is a schematic diagram of a third implementation of a user interface according to an embodiment of this application.

It may be understood that the user interfaces shown in FIG. 5A to FIG. 5C do not constitute a specific limitation on this application. In some other embodiments of this application, the user interface may prompt a service identifier in a manner different from the manner described above.

Further, if the dialogue information includes slot information corresponding to a second slot type, the user equipment may receive execution success information of a service from the dialogue processing device. If the dialogue information does not include the slot information corresponding to the second slot type, the user equipment may receive, from the dialogue processing device, a dialogue that requires the user to input corresponding slot information, and the user may input the corresponding slot information in response to the corresponding dialogue. Finally, the user equipment may receive the execution success information of the service from the dialogue processing device.

Figure 6:
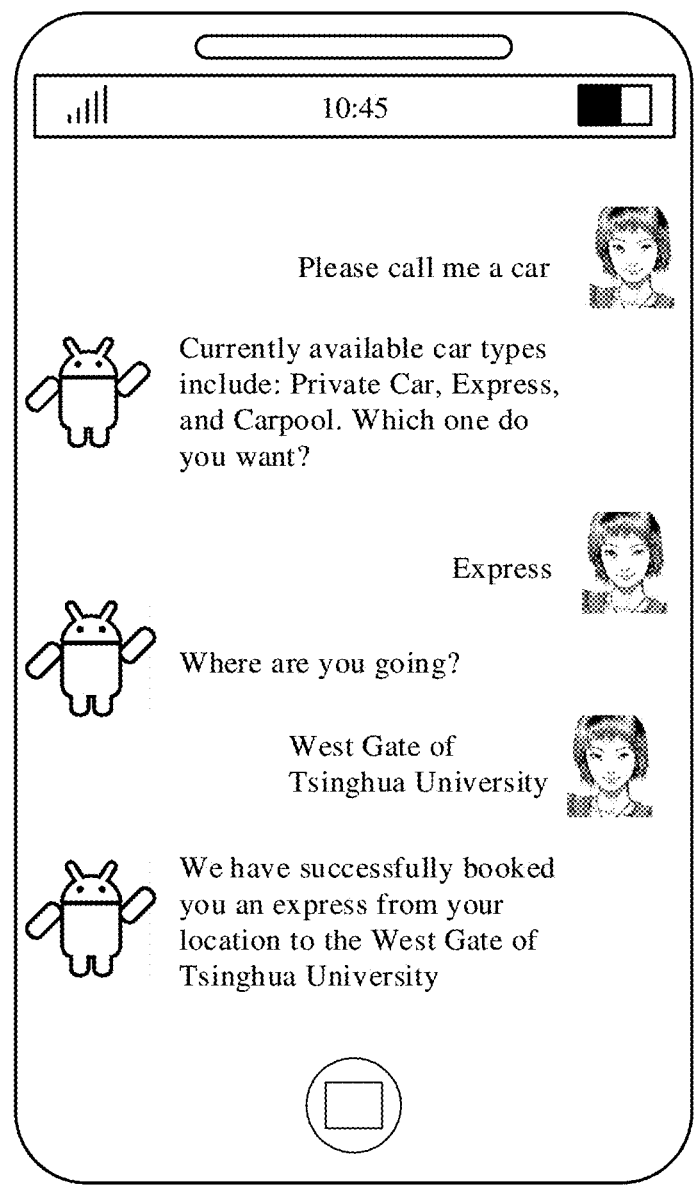
FIG. 6 is a schematic diagram of a user interface in a first implementation scenario according to an embodiment of this application.

For example, as shown in FIG. 6, the user inputs "Please call me a car" to the user interface, and then the user equipment prompts "Currently available car types include: Private Car, Express, and Carpool. Which one do you want?" Further, the user chooses "Express." Then the user interface may prompt "Where are you going?". After the user inputs "West Gate of Tsinghua University", the user interface prompts information "We have successfully booked you an express from your location to the West Gate of Tsinghua University."

Second implementation scenario: A user inputs dialogue information to user equipment, where the dialogue information includes slot information corresponding to a first slot type, but a server does not include a service corresponding to the slot information. Further, the user equipment may receive a plurality of service identifiers corresponding to the first slot type from a dialogue processing device. The user may select one of the plurality of service identifiers, and input the service identifier to the user equipment as the slot information of the first slot type. User interfaces corresponding to service identifiers are shown in FIG. 5A to FIG. 5C. In addition, a subsequent operation of the user and subsequent dialogue content prompted by the user equipment are similar to those in the first implementation scenario. Details are not repeated herein.

It may be understood that manners of prompting the plurality of service identifiers on the user interfaces are described in FIG. 5A to FIG. 5C. Details are not repeated herein.

Figure 7:
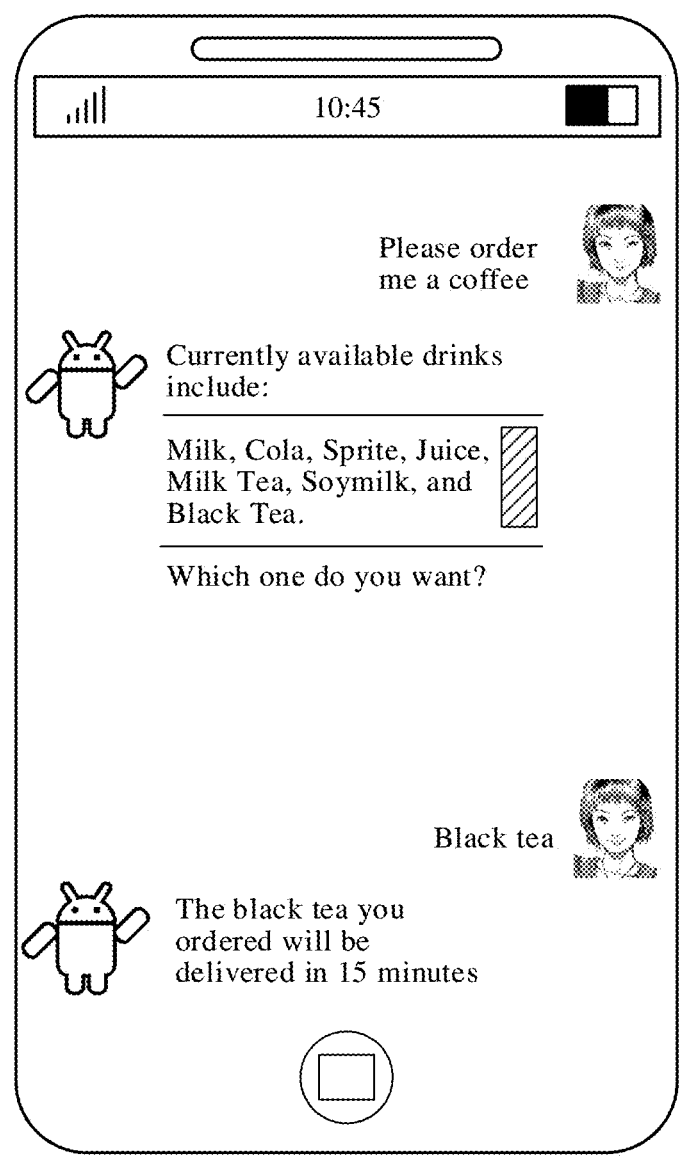
FIG. 7 is a schematic diagram of a user interface in a second implementation scenario according to an embodiment of this application.

For example, as shown in FIG. 7, the user inputs "Please order me a coffee" to a user interface. In this embodiment, for example, the coffee is sold out. In this case, the user equipment prompts "Currently available drinks include: Milk, Cola, Sprite, Juice, Milk Tea, Soymilk, and Black Tea. Which one do you want?". As shown in FIG. 6, "Drink" corresponds to a relatively large quantity of service identifiers. Therefore, the user equipment prompts the foregoing identifier by setting a menu bar of a scrollbar. The user may view an identifier corresponding to the "Drink" by sliding the scrollbar on the user interface in FIG. 6 up or down. Further, for example, the user selects "Black Tea". Then, the user interface prompts information "The black tea you ordered will be delivered in 15 minutes". The drink classes listed in this embodiment may be some drinks in the "Currently available drinks".

Third implementation scenario: A user inputs dialogue information to user equipment, where the dialogue information includes slot information corresponding to a first slot type. A dialogue processing device does not include the slot information, but a server includes a service corresponding to the slot information. After the user inputs slot information corresponding to a second slot type, the user equipment prompts execution success information of a service.

Figure 8:
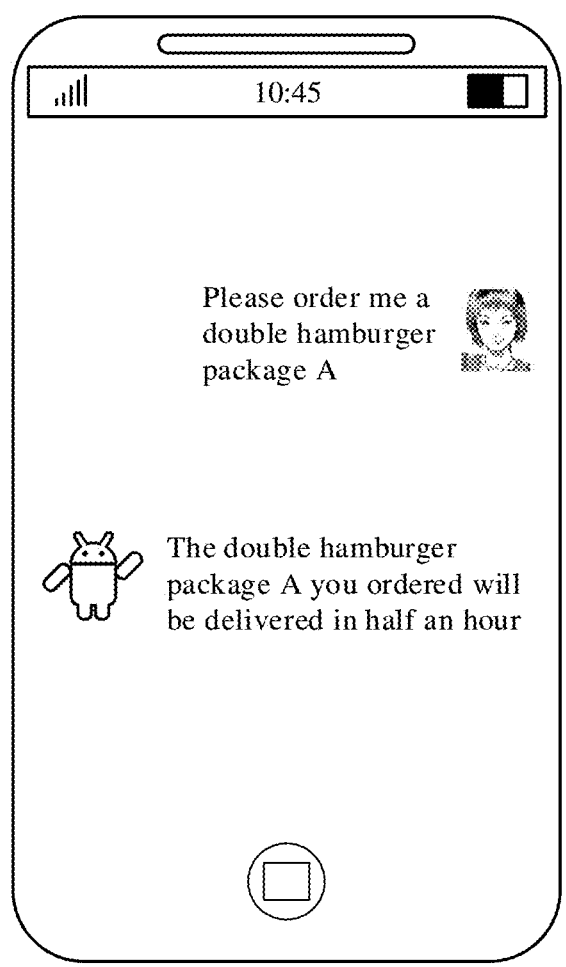
FIG. 8 is a schematic diagram of a user interface in a third implementation scenario according to an embodiment of this application.

For example, as shown in FIG. 8, the user inputs "Please order me a double hamburger package A" to the user interface. In this embodiment, the dialogue processing device does not include slot information corresponding to "Double Hamburger Package A", but the user equipment may receive information "The double hamburger package A you ordered will be delivered in half an hour".

Fourth implementation scenario: A user inputs dialogue information to user equipment, where the dialogue information includes slot information corresponding to a first slot type. However, a first server does not include a service corresponding to the slot information. After the user inputs slot information corresponding to a second slot type, the user equipment prompts information indicating that the service is successfully executed by a second server.

Figure 9:
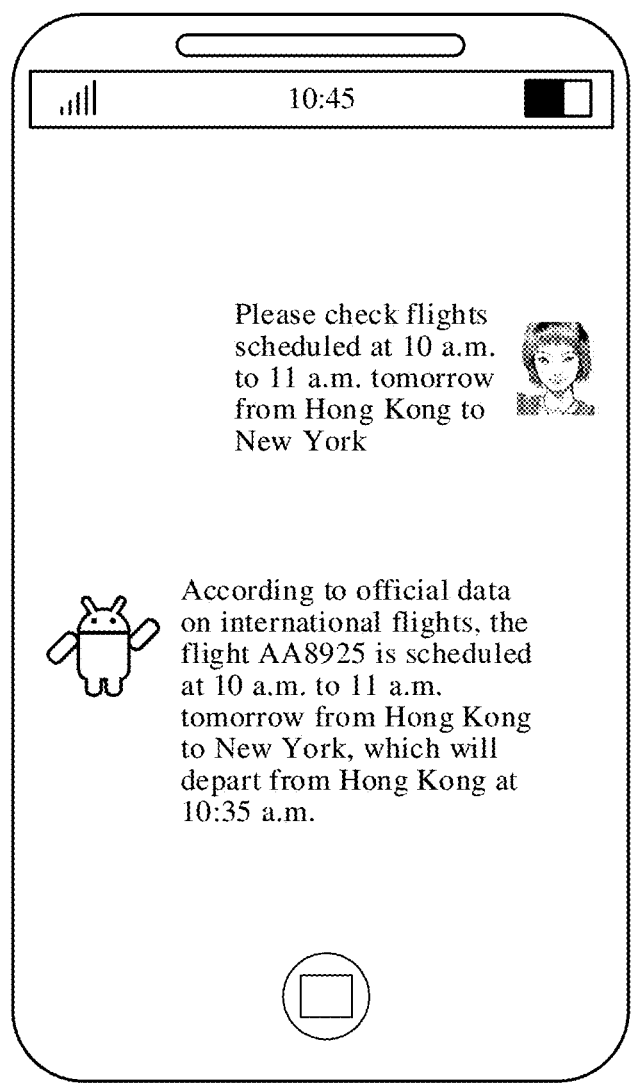
FIG. 9 is a schematic diagram of a user interface in a fourth implementation scenario according to an embodiment of this application.

For example, as shown in FIG. 9, the user inputs "Please check flights scheduled at 10 a.m. to 11 a.m. tomorrow from Hong Kong to New York" to a user interface. In this embodiment, the first server is a server that maintains domestic flight data, for example, a server of a specified domestic tourism platform. However, the user equipment may receive information "According to official data on international flights, the flight AA8925 is scheduled at 10 a.m. to 11 a.m. tomorrow from Hong Kong to New York, which will depart from Hong Kong at 10:35 a.m.".

Fifth implementation scenario: A user inputs dialogue information to user equipment, where the dialogue information includes slot information corresponding to a first slot type and/or slot information corresponding to a first slot type, but an indication meaning of at least one piece of the foregoing slot information is unclear. Further, the user equipment prompts information indicating that a corresponding service is executed based on an optimal solution.

That an indication meaning of slot information is unclear means that the slot information may indicate a plurality of pieces of different specific information. As a result, the dialogue processing device cannot trigger a determined service based on the slot information. For example, "Hotel near the Beijing station" in information "Please book a hotel near the Beijing station for me" includes at least more specific information such as "Hotel within 500 meters from the Beijing station", "Five-star hotel near the Beijing station", and "Five-star hotel within 500 meters from the Beijing station". Therefore, indication meanings of "near the Beijing station" and "hotel" in this embodiment are unclear. In addition, the optimal solution is a greatest, fastest, best and/or most economical solution for the user, for example, a shortest route for the user, or a package that requires minimum costs of the user.

Figure 10:
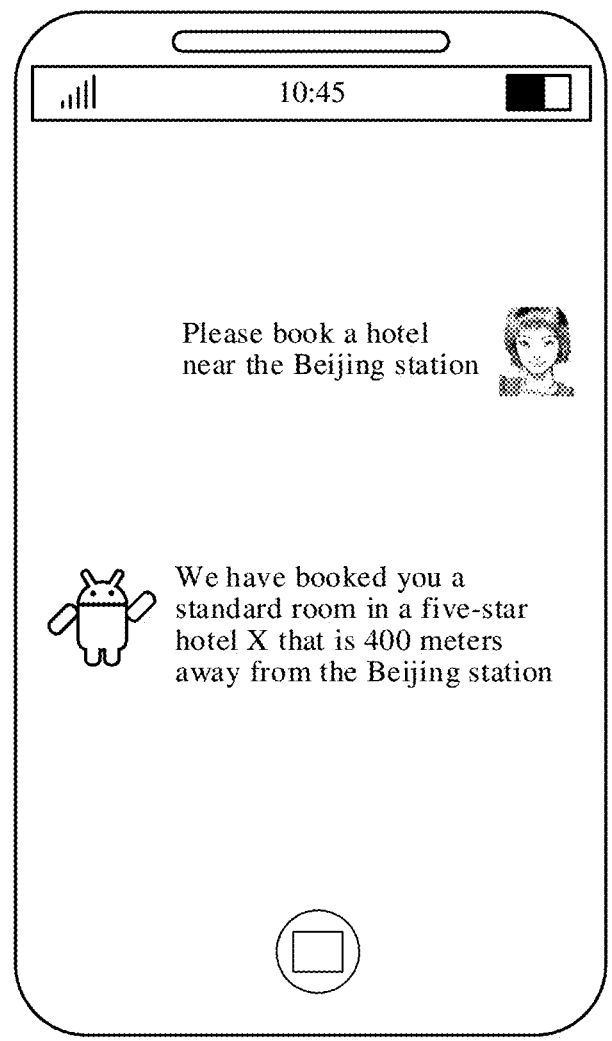
FIG. 10 is a schematic diagram of a user interface in a fifth implementation scenario according to an embodiment of this application.

For example, as shown in FIG. 10, the user inputs "Please book a hotel near the Beijing station for me" to a user interface. The user equipment receives and prompts "We have booked you a standard room in a five-star hotel X that is 400 meters away from the Beijing station". The "hotel X" is, for example, a five-star hotel closest to the Beijing station.

It may be understood that the implementation scenarios shown in FIG. 6 to FIG. 10 are merely some example implementation scenarios of this application, and do not constitute a limitation on an application scenario of this application. In some other embodiments, this application may be further applied to any other scenario in which any user triggers a service by using a man-machine dialogue.

It can be learned from the foregoing descriptions of the first implementation scenario to the fifth implementation scenario that, in the technical solution of this application, the user can obtain a desired service regardless of whether dialogue information input by the user includes the slot information corresponding to the first slot type, regardless of a correspondence between slot information input by the user and slot information preset in the dialogue processing device, and regardless of a correspondence between slot information input by the user and a service provided by a server. In this way, the user can be prevented from initiating a plurality of rounds of dialogues, and the user can learn, in a timely manner, a service provided by the server, thereby improving use experience of the user.

The first implementation scenario to the fifth implementation scenario are all described from a perspective of the user end. For an execution process of the foregoing scenario effect in this application, refer to the following descriptions of the dialogue processing device end. The following describes an execution process of the dialogue processing device end in this application with reference to the accompanying drawings and the foregoing implementation scenarios.

Figure 11:
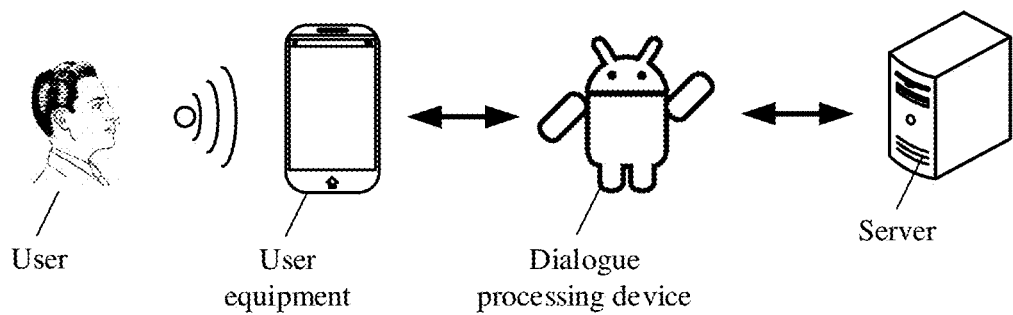
FIG. 11 is a schematic structural diagram of a first implementation of a man-machine interaction system according to an embodiment of this application.

FIG. 11 is an architectural diagram of a first implementation of a man-machine dialogue system according to an embodiment of this application. In this embodiment, an intent, a slot type, slot information, and the like maintained in a dialogue processing device correspond to a service supported by a server. A user may perform a dialogue with the dialogue processing device by using user equipment. The dialogue processing device may be described in FIG. 2A and FIG. 2B, and the user equipment may be described in FIG. 3A and FIG. 3B.

Figure 12:
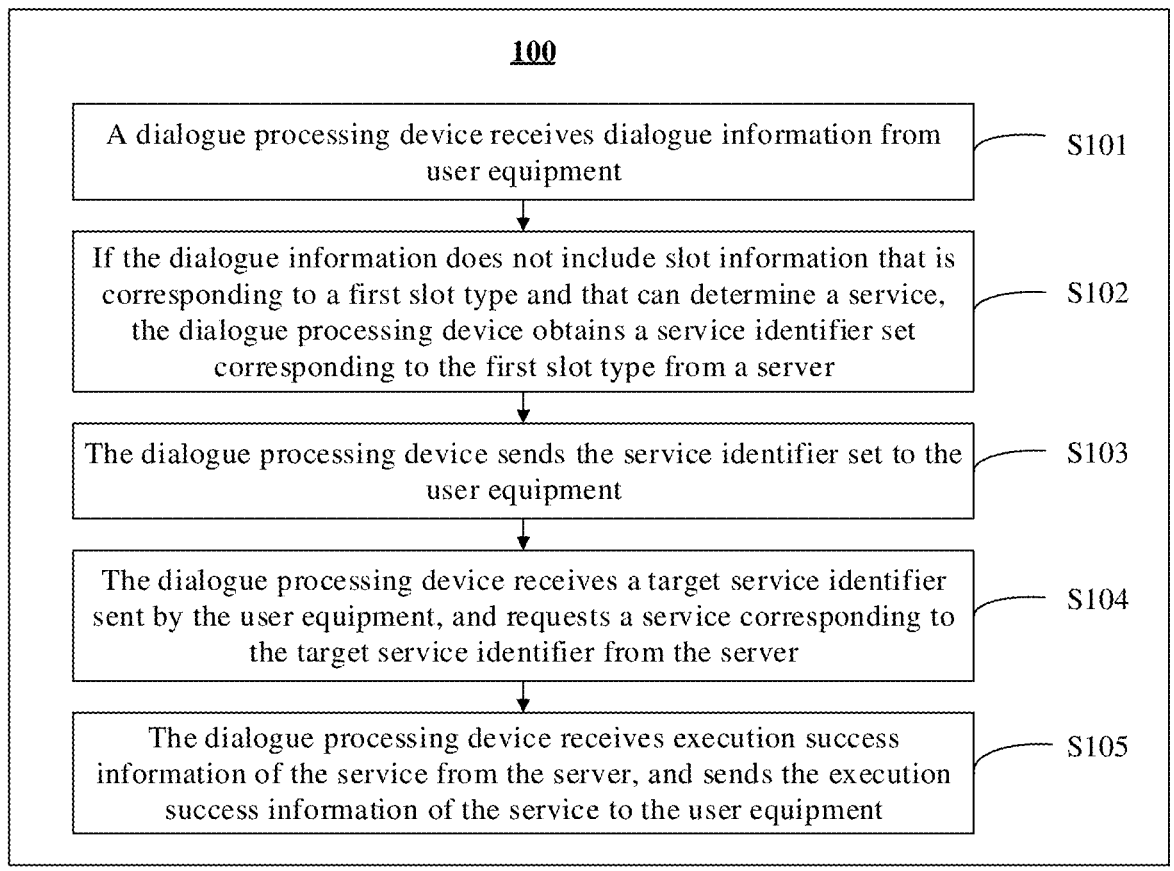
FIG. 12 is a method flowchart of a first implementation of a dialogue processing method according to an embodiment of this application.

With reference to the man-machine dialogue system shown in FIG. 11, FIG. 12 is a method flowchart of an implementation of a dialogue processing method according to an embodiment of this application. A dialogue processing method 100 shown in FIG. 12 includes the following steps.

Step S101: A dialogue processing device receives dialogue information from user equipment.

The dialogue information may be audio or a text. If the dialogue information is audio, the dialogue processing device may perform speech recognition on the audio, and then perform semantic understanding on content obtained after the speech recognition, to determine an intent corresponding to the dialogue information. If the dialogue information is a text, the dialogue processing device may perform semantic understanding on the text, to determine an intent corresponding to the dialogue information. Further, the dialogue processing device determines one or more mandatory slot types corresponding to the intent, and determines whether each of the one or more mandatory slot types is a first slot type or a second slot type. Then, the dialogue processing device may identify whether the dialogue information includes slot information corresponding to the first slot type. The first slot type in this embodiment is a slot type to which slot information, which is in mandatory slot information and which is used to indicate a service identifier, belongs. The second slot type in this embodiment is a slot type of regular slot information in the mandatory slot information.

Optionally, based on the foregoing descriptions of the first slot type and the second slot type, the dialogue processing device may determine, by identifying whether each mandatory slot type includes a preset label, whether the mandatory slot type is the first slot type. If the mandatory slot type includes the preset label, the dialogue processing device considers that the mandatory slot type is the first slot type. If the mandatory slot type does not include the preset label, the dialogue processing device considers that the mandatory slot type is the second slot type. For a process of setting the preset label and content of the preset label, refer to the embodiment corresponding to FIG. 4. Details are not repeated herein.

Optionally, the dialogue processing device may identify one or more keywords in the dialogue information. Further, corresponding to each of the one or more keywords, in some embodiments, the dialogue processing device determines, by using a word vector model, a slot type to which the keyword belongs. In some other embodiments, the dialogue processing device determines, by using an expression format of the keyword, the slot type to which the keyword belongs. For example, it may be determined, based on a format of a keyword "12:30", that the keyword "12:30" belongs to a slot type "time".

Step S102: If the dialogue information does not include slot information that is corresponding to a first slot type and that can determine a service, the dialogue processing device obtains a service identifier set corresponding to the first slot type from a server.

The service identifier set includes all service identifiers corresponding to the first slot type.

Step S103: The dialogue processing device sends the service identifier set to the user equipment.

That the dialogue information does not include slot information that is corresponding to a first slot type and that can determine a service may include two scenarios. Scenario 1: The dialogue information does not include the slot information corresponding to the first slot type. Scenario 2: The dialogue information includes the slot information corresponding to the first slot type, but the server does not include a service corresponding to the slot information. Based on this, to avoid a case that a user inputs the slot information corresponding to the first slot type a plurality of times, when any one of the foregoing implementations occurs, the dialogue processing device may send an obtaining request to the server, where the obtaining request may include an identifier of the first slot type. Then, the server responds to the obtaining request, and sends the service identifier set formed by all the service identifiers corresponding to the first slot type to the dialogue processing device. The dialogue processing device may send the service identifier set to the user equipment, so that the user selects any service identifier as the slot information corresponding to the first slot type.

Case 1: If the dialogue processing device does not obtain the slot information corresponding to the first slot type from the dialogue information, the dialogue processing device determines that the dialogue information does not include the slot information corresponding to the first slot type.

For example, this case is similar to the first implementation scenario and the embodiment shown in FIG. 6. Details are not repeated herein.

Case 2: The dialogue processing device obtains the slot information corresponding to the first slot type from the dialogue information, and further the dialogue processing device requests services corresponding to all mandatory slot information from the server based on all the mandatory slot information included in the dialogue information. If execution failure information of a service is received from the server, the dialogue processing device determines that the dialogue information does not include the slot information that is corresponding to the first slot type and that can determine a service.

For example, as described in the foregoing second implementation scenario and the embodiment shown in FIG. 7, after receiving dialogue information "Please order me a coffee", the dialogue processing device can determine slot information "coffee" corresponding to the first slot type from the dialogue information "Please order me a coffee". Then the dialogue processing device requests a "coffee ordering" service from the server. Because the coffee is sold out, the server fails to execute the "coffee ordering" service, and may send execution failure information to the dialogue processing device. In some other embodiments, after the server fails to execute the "coffee ordering" service, the server may further directly send an in-stock drink shown in FIG. 7 to the dialogue processing device.

A manner in which the user equipment prompts all the service identifiers is shown in FIG. 5A to FIG. 5C. Details are not repeated herein.

Step S104: The dialogue processing device receives a target service identifier sent by the user equipment, and requests a service corresponding to the target service identifier from the server.

The target service identifier belongs to the foregoing service identifier set. In this application, the target service identifier is used as the slot information corresponding to the first slot type.

It may be understood that, before performing this step, the dialogue processing device has learned of slot information corresponding to the second slot type.

Step S105: The dialogue processing device receives execution success information of a service from the server, and sends the execution success information of the service to the user equipment.

It can be learned that, in the technical solution of this application, if a service item defined by the server does not correspond to slot information of a corresponding slot type, the dialogue processing device feeds back all service identifiers maintained by the server to the user, so that corresponding slot information input by the user definitely corresponds to a specified service item in the server. In this implementation, a service item can be presented to the user in a timely manner, and the user can be prevented from initiating a plurality of rounds of dialogues with the dialogue processing device, thereby improving service execution efficiency and further improving use experience of the user.

Figure 13:
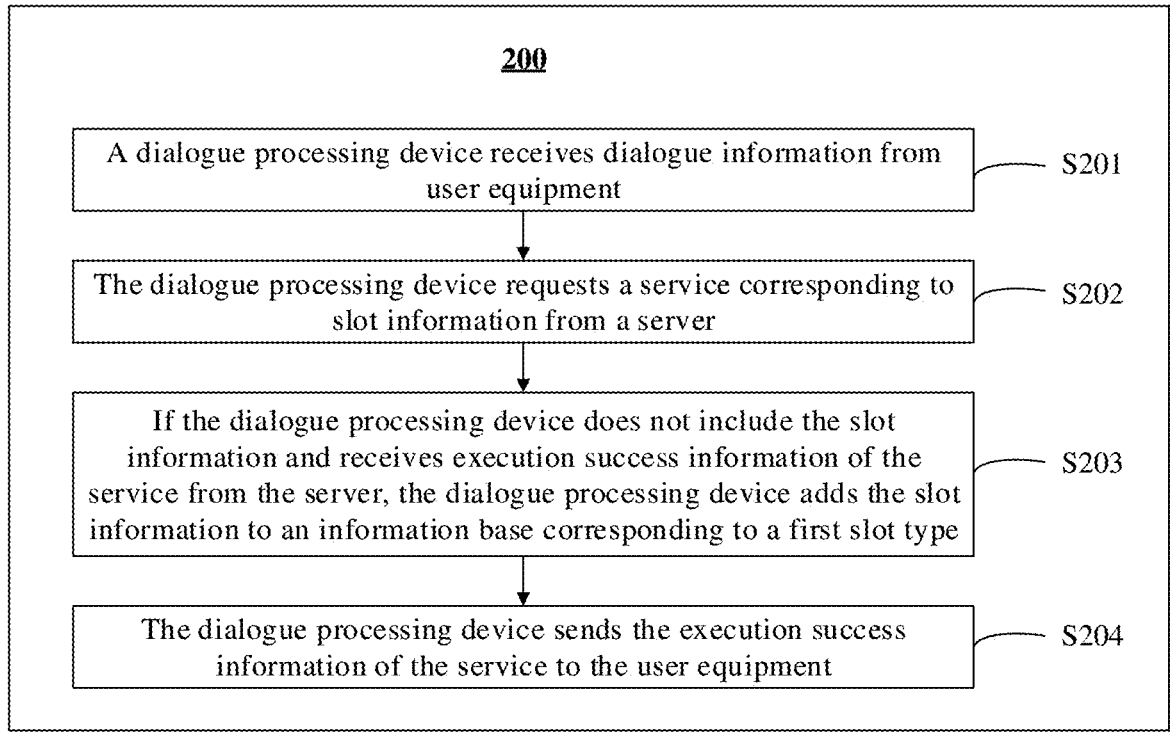
FIG. 13 is a method flowchart of a second implementation of a dialogue processing method according to an embodiment of this application.

With reference to the man-machine dialogue system shown in FIG. 11, FIG. 13 is a method flowchart of another implementation of a dialogue processing method according to an embodiment of this application. A dialogue processing method 200 shown in FIG. 13 includes the following steps.

Step S201: A dialogue processing device receives dialogue information from user equipment.

The dialogue information includes slot information corresponding to a first slot type. In addition, in this embodiment, an operation after the dialogue processing device receives the dialogue information is similar to the descriptions of step S101 in the method 100. Details are not repeated herein.

Step S202: The dialogue processing device requests a service corresponding to slot information from a server.

In this embodiment, even if the slot information is not included in slot information preset in the dialogue processing device, the dialogue processing device still requests, based on the slot information, the server to provide a corresponding service.

Step S203: If the dialogue processing device does not include the slot information and receives execution success information of the service from the server, the dialogue processing device adds the slot information to an information base corresponding to the first slot type.

If the slot information is not included in the slot information preset in the dialogue processing device and the service is successfully executed by the server, it indicates that a service item maintained in the server is updated, but the slot information corresponding to the first slot type in the dialogue processing device is not updated in a timely manner. For example, with reference to the embodiment shown in FIG. 8, a new product "Double Hamburger Package A" is added to the server end, but the dialogue processing device does not update an information base corresponding to a slot type "Package". In this case, the dialogue processing device may add slot information corresponding to the "Double Hamburger Package A" to the information base corresponding to the slot type "Package". In addition, in this embodiment, the slot information corresponding to "Double Hamburger Package A" may be "Double Hamburger Package A".

Step S204: The dialogue processing device sends the execution success information of the service to the user equipment.

It can be learned that in this implementation, rounds of dialogues between the dialogue processing device and a user can be reduced, a service can be provided for the user in a timely manner, and the dialogue processing device can update, in a timely manner, slot information maintained by the dialogue processing device.

A user interface corresponding to the method 200 is shown in the third implementation scenario and FIG. 8. Details are not repeated herein.

With reference to the man-machine dialogue system shown in FIG. 11, this application further provides a third implementation of a dialogue processing method. A dialogue processing method includes:

A dialogue processing device receives dialogue information from user equipment, and then determines keywords corresponding to all mandatory slot types in the dialogue information. If any keyword in the keywords corresponding to all the mandatory slot types corresponds to at least two pieces of slot information of a corresponding slot type, the dialogue processing device determines specific slot information corresponding to an optimal service solution in the at least two pieces of slot information. Further, the dialogue processing device may request a service corresponding to the specific slot information from a server, and send execution success information of a corresponding service to the user equipment after receiving the execution success information of the corresponding service from the server.

A keyword of at least two pieces of slot information corresponding to one slot type may be a general word including a plurality of pieces of specific slot information. For example, "Hotel near the Beijing station" may include slot information, for example, names of all hotels within 1000 meters from the Beijing station. For another example, "Tsinghua University" may include slot information, for example, addresses of all gates of Tsinghua University.

In this application, an "optimal" standard in the "optimal service solution" varies based on service content and a user requirement. For example, with reference to the embodiment shown in FIG. 10, an optimal service solution of "Please book a hotel near the Beijing station for me" may be, for example, a hotel closest to the Beijing station, or may be a hotel with a highest star rating within 1000 meters from the Beijing station. For another example, an optimal service solution of dialogue information "Please call me a car to Tsinghua University" may be a solution with a shortest driving route or a car with minimum costs. Based on this, the dialogue processing device may perform determining based on a computing model of a corresponding service scenario. The computing model may be obtained through training based on big data of the corresponding service scenario and historical user order data.

Further, in this embodiment, after determining the at least two pieces of slot information corresponding to the keyword, the dialogue processing device may separately determine whether a service corresponding to each piece of slot information is the foregoing "optimal service solution", and determine the piece of slot information as the specific slot information if yes.

It can be learned that, in this implementation, the dialogue processing device may automatically provide a relatively optimal service for a user if a meaning of a keyword input by the user is vague. In this way, a plurality of rounds of dialogues with the user can be avoided, and an operation can be flexible, thereby further improving use experience of the user.

Figure 14:
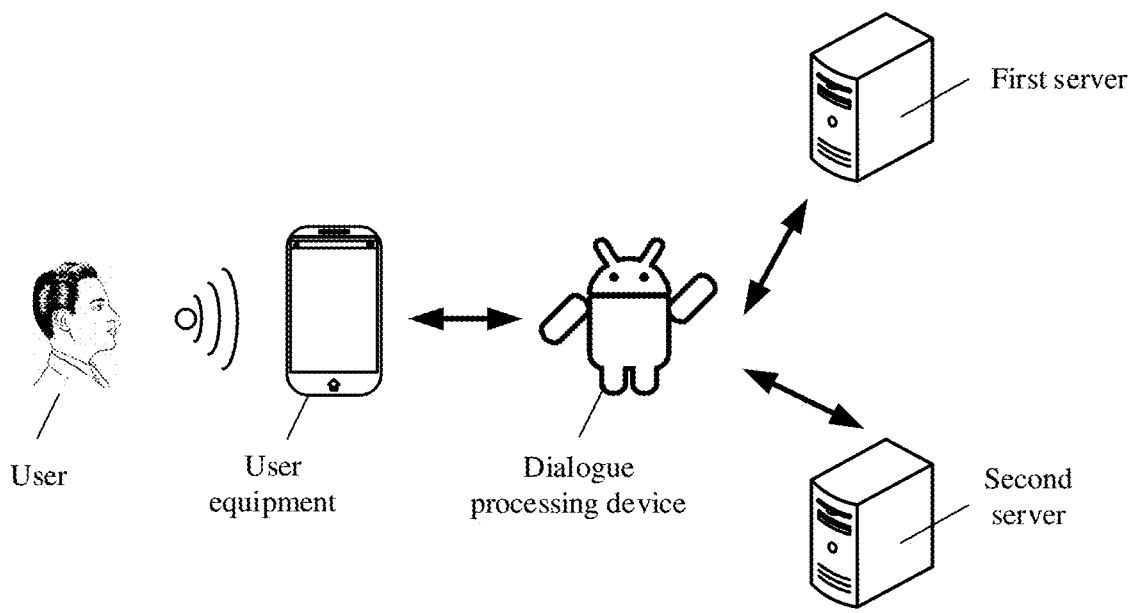
FIG. 14 is a schematic structural diagram of a second implementation of a man-machine interaction system according to an embodiment of this application.

FIG. 14 is an architectural diagram of a second implementation of a man-machine dialogue system according to an embodiment of this application. In this embodiment, a dialogue processing device establishes a connection to a first server and a second server. A user may perform a dialogue with a dialogue device by using user equipment. The dialogue processing device may be described in FIG. 2A and FIG. 2B, and the user equipment may be described in FIG. 3A and FIG. 3B.

Figure 15:
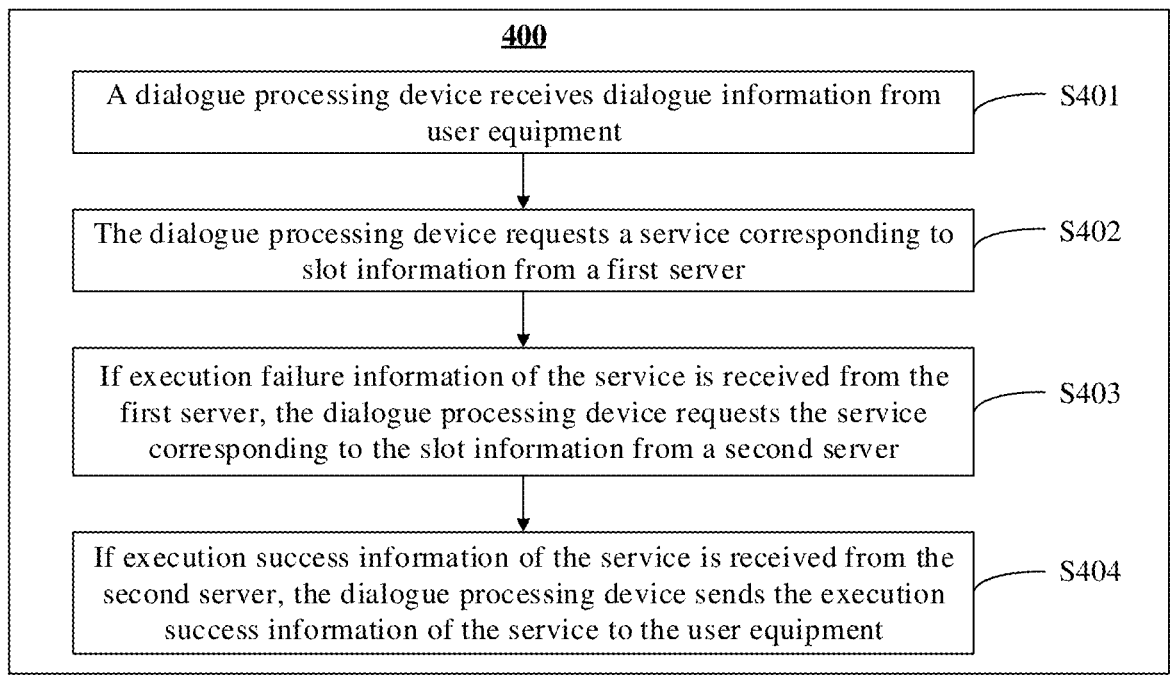
FIG. 15 is a method flowchart of a fourth implementation of a dialogue processing method according to an embodiment of this application.

With reference to the man-machine dialogue system shown in FIG. 14, FIG. 15 is a method flowchart of a fourth implementation of a dialogue processing method according to this application. A dialogue processing method 400 shown in FIG. 15 includes the following steps.

Step S401: A dialogue processing device receives dialogue information from user equipment.

The dialogue information includes slot information corresponding to a first slot type. In addition, in this embodiment, an operation after the dialogue processing device receives the dialogue information is similar to the descriptions of step S101 in the method 100. Details are not repeated herein.

Step S402: The dialogue processing device requests a service corresponding to slot information from a first server.

Step S403: If execution failure information of the service is received from the first server, the dialogue processing device requests the service corresponding to the slot information from a second server.

Step S404: If execution success information of the service is received from the second server, the dialogue processing device sends the execution success information of the service to the user equipment.

A user interface corresponding to the method 400 is shown in the fourth implementation scenario and FIG. 9. Details are not repeated herein.

For example, in this embodiment, the first server may be a server that provides a customized service, and the second server may be an official server related to a service provided by the first server. With reference to the embodiment shown in FIG. 9, the first server is, for example, a server that provides a domestic tourism service, and the second server is, for example, an official server that provides domestic and international flight data.

It can be learned that in this implementation, when the first server cannot provide a service, the dialogue processing device may trigger the second server to provide a corresponding service. In this way, rounds of dialogues between the dialogue processing device and a user can be reduced, and a service can be provided for the user in a timely manner.

In an optional implementation, in the embodiments shown in FIG. 11 to FIG. 15, the dialogue processing device may be a solution on a cloud side, that is, the dialogue processing device is the server and is an entity relatively independent of the user equipment.

In another optional implementation, in the foregoing embodiments shown in FIG. 11 to FIG. 15, the dialogue processing device may be an edge-cloud synergy solution, that is, the dialogue processing device includes function modules on the server and the user equipment. For example, the dialogue processing device may include a Bot platform of the server and an application on the user equipment.

In another optional implementation, in the foregoing embodiments shown in FIG. 11 to FIG. 15, the dialogue processing device may be a solution on an edge side, that is, the dialogue processing device is a function module integrated into the user equipment. For example, the dialogue processing device may be an application on the user equipment. It may be understood that, when the dialogue processing device may be a solution on the terminal side, hardware of the dialogue processing device is hardware corresponding to the user equipment.

The following embodiment provides a method for user equipment. The user equipment may be as illustrated in FIG. 3A and FIG. 3B.

Figure 16:
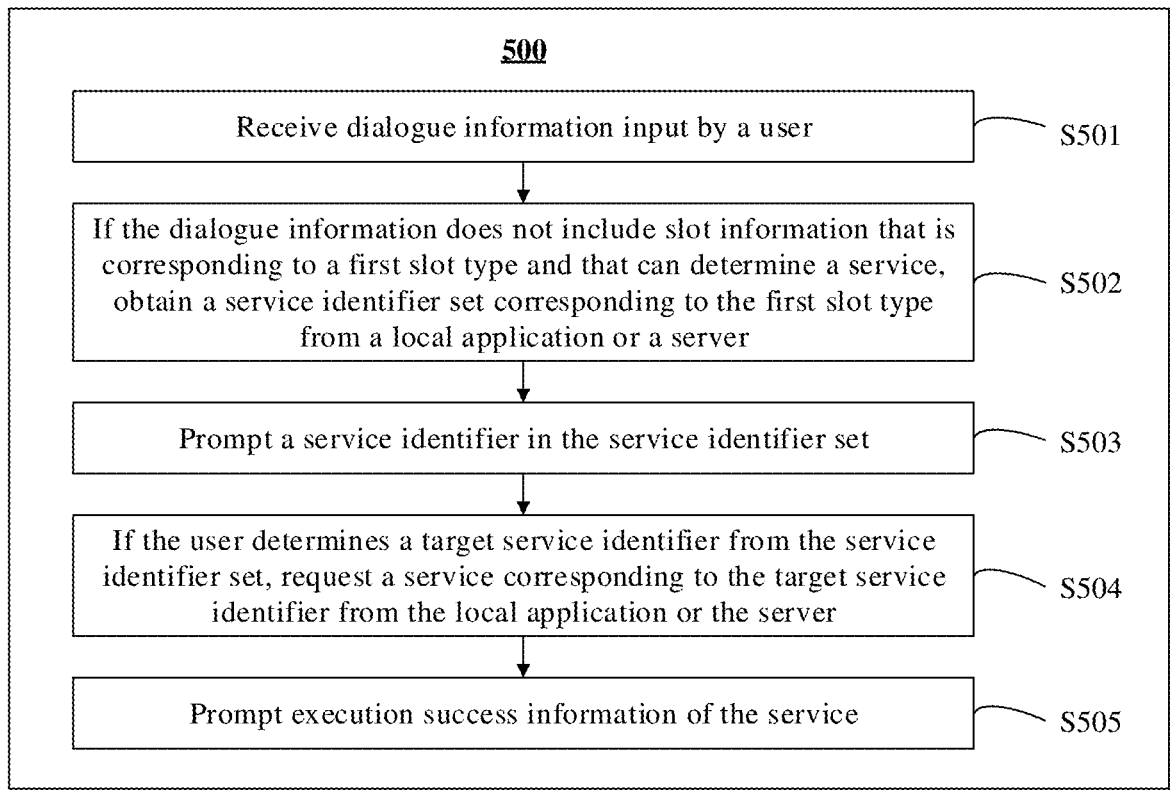
FIG. 16 is a method flowchart of a fifth implementation of a dialogue processing method according to an embodiment of this application.

FIG. 16 is a method flowchart of a fifth implementation of a dialogue processing method for user equipment according to an embodiment of this application. A dialogue processing method 500 shown in FIG. 16 includes the following steps.

Step S501: Receive dialogue information input by a user.

In an optional implementation, user equipment may receive the dialogue information of the user by using a man-machine dialogue application, where the dialogue information indicates a service that the user wants to book. The man-machine dialogue application may be a speech assistant, or may be another installed application that may implement a dialogue function. The dialogue information may be speech information, and may be other information such as a text or a gesture.

Step S502: If the dialogue information does not include slot information that is corresponding to a first slot type and that can determine a service, obtain a service identifier set corresponding to the first slot type from a local application or a server.

In an embodiment, if the slot information corresponding to the first slot type included in the dialogue information input by the user does not match a service identifier set of an application that can currently provide a service, for example, the user wants to book a hitch-riding service of the Didi Taxi application, but currently the Didi Taxi application does not provide the hitch-riding service, the man-machine dialogue application may query the service identifier set corresponding to the first slot type from the local application for selection by the user. The local application is an application that can provide a service that the user wants to book. The local application may be a third-party application, for example, the Didi Taxi application, which is different from the man-machine dialogue application.

In another embodiment, if the slot information corresponding to the first slot type included in the dialogue information input by the user does not match a service identifier set of an application that can currently provide a service, the man-machine dialogue application may also query the service identifier set corresponding to the first slot type from the server for selection by the user. The server may be a server corresponding to the local application, or may be a server corresponding to the man-machine dialogue application. This is not limited in embodiments of this application.

Similarly, if the dialogue information input by the user does not include the slot information corresponding to the first slot type, for example, the user wants to book a car for travel, but there is no car type information, and a car type is necessary information for booking a car, the man-machine dialogue application may query the service identifier set corresponding to the first slot type from the local application or from the server for selection by the user.

Step S503: Prompt a service identifier in the service identifier set.

Optionally, the user equipment may prompt the user by using a speech, for example, by using a speech announcement of a speech assistant. The user equipment may alternatively prompt the user by using a text, or prompt the user by combining a plurality of manners, or the like. This is not limited in embodiments of this application.

Step S504: If the user determines a target service identifier from the service identifier set, request a service corresponding to the target service identifier from the local application or the server.

Similar to the descriptions of step S502, in this step, the user equipment may request a service from the local application such as the Didi Taxi application, or may directly request a service from the server. The user equipment may request a service from the server, or may directly send a request to the server corresponding to the man-machine dialogue application, or may directly request a service from the server corresponding to the local application. This is not limited in embodiments of this application.

Step S505: Prompt execution success information of the service.

For example, if the user wants to book a car, the user may prompt the user that the car is successfully booked.

It should be noted that the foregoing example dialogue processing methods are based on a general technical concept. Based on this, parts that are the same or similar in the example dialogue processing methods are not repeated herein. Execution processes of the example dialogue processing methods and prompt effects presented on corresponding user interfaces may be mutually referenced.

In view of the above, in the technical solution of this application, if a service item defined by the server does not correspond to slot information of a corresponding slot type, the dialogue processing device feeds back a service identifier maintained by the server to the user, so that corresponding slot information input by the user definitely corresponds to a specified service item in the server. In this implementation, a service item can be presented to the user in a timely manner, and the user can be prevented from initiating a plurality of rounds of dialogues with the dialogue processing device, thereby improving service execution efficiency and further improving use experience of the user.

In the foregoing embodiments provided in this application, the solutions of the dialogue processing method provided in the embodiments of this application are described separately from perspectives of each device and interaction between devices. For example, the dialogue processing device, the user equipment, and the server all include corresponding hardware structures and/or software modules for performing functions. A person of ordinary skill in the art should easily be aware that, in combination with the examples described in the embodiments disclosed in this specification, modules, algorithm steps may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In specific implementation, corresponding to the foregoing devices, an embodiment of this application further provides a computer storage medium. A computer storage medium disposed in any device may store a program. When the program is executed, some or all of the steps in the embodiments shown in FIG. 4 to FIG. 15 may be performed. The storage medium may be a magnetic disk, an optical disc, a read-only memory (ROM for short), a random access memory (RAM for short), or the like.

A person of ordinary skill in the art may further understand that various illustrative logical blocks and steps that are listed in the embodiments of this application may be implemented by using electronic hardware, computer software, or a combination thereof. Whether the functions are implemented by using hardware or software depends on particular applications and a design requirement of the entire system. A person of ordinary skill in the art may use various methods to implement the described functions for each particular application, but it should not be considered that the implementation goes beyond the scope of the embodiments of this application.

It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

All or some of the foregoing embodiments may be implemented by using software, hardware, firmware, or any combination thereof. When software is used to implement the embodiments, the embodiments may be implemented totally or partially in a form of a computer program product.

The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive, a Solid State Disk (SSD)), or the like.

Although some embodiments of this application have been described, a person of ordinary skill in the art can make changes and modifications to these embodiments once they learn the basic inventive concept. Therefore, the following claims are intended to be construed as to cover the embodiments and all changes and modifications falling within the scope of the embodiments of this application.

Obviously, persons of ordinary skill in the art can make various modifications and variations to the embodiments of this application without departing from the scope of the embodiments of this application. The embodiments of this application are intended to cover these modifications and variations provided that they fall within the scope of protection defined by the following claims and their equivalent technologies.

What is claimed is:

1. A dialogue processing method, comprising:
   receiving, by a dialogue processing device, dialogue information from user equipment;
   determining whether the dialogue information does not comprise slot information that is corresponding to a first slot type and that can determine a service;
   upon determination that the dialogue information does not comprise the slot information that is corresponding to the first slot type and that can determine a service, obtaining, by the dialogue processing device, a service identifier set corresponding to the first slot type from a server, wherein the first slot type indicates a slot type corresponding to slot information that is in mandatory slot information and that is used to indicate a service identifier, and the service identifier set comprises a plurality of service identifiers corresponding to the first slot type;
   sending, by the dialogue processing device, the service identifier set to the user equipment;
   determining whether a target service identifier is received from the user equipment;
   upon determination that the target service identifier is received from the user equipment, requesting, by the dialogue processing device, a service corresponding to the target service identifier from the server, wherein the target service identifier is within the service identifier set;
   determining whether execution success information of a service is received from the server; and
   upon determination that the execution success information of the service is received from the server, sending, by the dialogue processing device, the execution success information to the user equipment,
   wherein the method further comprises, after receiving the dialogue information from the user equipment, and before obtaining the service identifier set corresponding to the first slop type from the server;
   determining whether the slot information corresponding to the first slot type is not obtained from the dialogue information through parsing; and
   upon determining that the slot information corresponding to the first slot type is not obtained from the dialogue information through parsing, determining, by the dialogue processing device, that the dialogue information does not comprise the slot information that is corresponding to the first slot type and that can determine a service.

2. The dialogue processing method according to claim 1, further comprising, after receiving the dialogue information from the user equipment, and before obtaining the service identifier set corresponding to the first slot type from the server:
   parsing, by the dialogue processing device, the dialogue information to obtain the slot information corresponding to the first slot type;
   requesting, by the dialogue processing device, a service corresponding to the slot information from the server;
   determining whether execution failure information of a service is received from the server; and
   upon determination that the execution failure information of the service is received from the server, determining, by the dialogue processing device, that the dialogue information does not comprise the slot information that is corresponding to the first slot type and that can determine a service.

3. The dialogue processing method according to claim 1, further comprising, after receiving the dialogue information from the user equipment, and before sending the execution success information to the user equipment:
   parsing, by the dialogue processing device, the dialogue information to obtain the slot information corresponding to the first slot type;
   requesting, by the dialogue processing device, a service corresponding to the slot information from the server;
   determining whether the execution success information of the service is received from the server and the dialogue processing device does not comprise the slot information; and
   upon determination that the execution success information of the service is received from the server and the dialogue processing device does not comprise the slot information, adding, by the dialogue processing device, the slot information to an information base corresponding to the first slot type.

4. The dialogue processing method according to claim 1, further comprising, before receiving the dialogue information from the user equipment:
   receiving, by the dialogue processing device, a label addition instruction, wherein the label addition instruction corresponds to the first slot type; and
   adding, by the dialogue processing device, a label to the first slot type.

5. The dialogue processing method according to claim 1, wherein
the dialogue information is a text or audio.

6. A dialogue processing method, comprising:
sending, by user equipment, dialogue information to a dialogue processing device;
receiving, by the user equipment, a service identifier set corresponding to a first slot type from the dialogue processing device, and prompting the service identifier set corresponding to the first slot type, wherein the first slot type indicates a slot type corresponding to slot information that is in mandatory slot information and that is used to indicate a service identifier, and the service identifier set comprises a plurality of service identifiers corresponding to the first slot type, and wherein, when the slot information corresponding to the first slot type is not obtained from the dialogue information, the dialogue processing device determines that the dialogue information does not comprise the slot information that is corresponding to the first slot type and that can determine a service;
sending, by the user equipment, a target service identifier to the dialogue processing device, wherein the target service identifier is within the service identifier set; and
receiving, by the user equipment, execution success information of a service from the dialogue processing device, wherein the service is a service corresponding to the target service identifier.

7. The dialogue processing method according to claim 6, wherein prompting the service identifier set corresponding to the first slot type comprises:
prompting, by the user equipment, all service identifiers in the service identifier set.

8. The dialogue processing method according to claim 6, wherein prompting the service identifier set corresponding to the first slot type comprises:
prompting, by the user equipment, a portal identifier for linking the service identifier set;
receiving, by the user equipment, an opening instruction input by a user; and
prompting, by the user equipment, a page linked to the portal identifier, wherein the page comprises all service identifiers in the service identifier set.

9. The dialogue processing method according to claim 6, wherein prompting the service identifier set corresponding to the first slot type comprises:
prompting, by the user equipment, a menu control, wherein the menu control prompts some service identifiers in the service identifier set;
receiving, by the user equipment, a prompt instruction input by a user; and
switching, by the user equipment, a service identifier prompted in the menu control.

10. A device, comprising:
one or more processors; and
a memory storing one or more computer programs, wherein the one or more computer programs comprise instructions, and when the instructions are executed by the one or more processors, the device is enabled to perform operations comprising:
receiving dialogue information input by a user;
determining whether the dialogue information does not comprise slot information that is corresponding to a first slot type and that can determine a service;
upon determination that the dialogue information does not comprise the slot information, obtaining a service identifier set corresponding to the first slot type from a local application or a server, wherein the first slot type indicates a slot type corresponding to slot information that is in mandatory slot information and that is used to indicate a service identifier, and the service identifier set comprises a plurality of service identifiers corresponding to the first slot type;
prompting a service identifier in the service identifier set;
determining whether the user determines a target service identifier from the service identifier set;
upon determination that the user determines the target service identifier from the service identifier set, requesting a service corresponding to the target service identifier from the local application or the server; and
prompting execution success information of the service, wherein the operations further comprise:
determining whether the slot information corresponding to the first slot type is not obtained from the dialogue information through parsing; and
upon determination that the slot information corresponding to the first slot type is not obtained from the dialogue information, determining that the dialogue information does not comprise the slot information that is corresponding to the first slot type and that can determine a service.

11. The device according to claim 10, wherein the operations further comprise:
parsing the dialogue information to obtain the slot information corresponding to the first slot type;
requesting a service corresponding to the slot information from the server;
determining whether execution failure information of a service is received from the server; and
upon determination that the execution failure information of the service is received from the server, determining that the dialogue information does not comprise the slot information that is corresponding to the first slot type and that can determine a service.

12. The device according to claim 10, wherein the operations further comprise:
obtaining the service identifier set corresponding to the first slot type from the local application;
obtaining the service identifier set corresponding to the first slot type from the server; or
invoking the local application to obtain the service identifier set corresponding to the first slot type from the server.

13. The device according to claim 10, wherein the operations further comprise:
prompting all service identifiers in the service identifier set; or
prompting a portal identifier for linking the service identifier set, and for an opening instruction input by a user, prompting a page linked to the portal identifier, wherein the page comprises all service identifiers in the service identifier set; or
prompting a menu control, wherein the menu control prompts some service identifiers in the service identifier set, and for a prompt instruction input by a user, switching a service identifier prompted in the menu control.

* * * * *

UNITED STATES PATENT AND TRADEMARK OFFICE
CERTIFICATE OF CORRECTION

PATENT NO. : 11,977,815 B2
APPLICATION NO. : 17/371377
DATED : May 7, 2024
INVENTOR(S) : Hongfeng Luo It is certified that error appears in the above-identified patent and that said Letters Patent is hereby corrected as shown below:

In the Claims

Column 30, Claim 1, Line 10, change "slop" to --slot--.

Signed and Sealed this
Fourth Day of June, 2024

Katherine Kelly Vidal
*Director of the United States Patent and Trademark Office*